(12) United States Patent
Ikeda

(10) Patent No.: US 7,869,105 B2
(45) Date of Patent: Jan. 11, 2011

(54) TRANSMISSION AND COMMUNICATION APPARATUS INCLUDING THE SAME

(75) Inventor: Akihiro Ikeda, Obu (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 783 days.

(21) Appl. No.: 11/902,153

(22) Filed: Sep. 19, 2007

(65) Prior Publication Data

US 2008/0074709 A1 Mar. 27, 2008

(30) Foreign Application Priority Data

Sep. 21, 2006 (JP) .............................. 2006-255292

(51) Int. Cl.
*H04N 1/04* (2006.01)
(52) U.S. Cl. ..................... 358/498; 358/471; 358/496; 358/474
(58) Field of Classification Search ................ 358/498, 358/471, 496, 474, 296; 399/367
See application file for complete search history.

(56) References Cited

U.S. PATENT DOCUMENTS

| 6,178,863 | B1 * | 1/2001 | Kobayashi et al. | ............ 83/649 |
| 7,151,622 | B2 * | 12/2006 | Suzuki et al. | ............... 358/498 |
| 7,227,672 | B2 * | 6/2007 | Isozaki et al. | ............... 358/414 |
| 2002/0118395 | A1 | 8/2002 | Isozaki et al. | |
| 2004/0109189 | A1 | 6/2004 | Ikeda et al. | |
| 2005/0286951 | A1 | 12/2005 | Ikeda | |

FOREIGN PATENT DOCUMENTS

| JP | U-57-92339 | 6/1982 |
| JP | U-63-181577 | 11/1988 |
| JP | A 2001-234193 | 8/2001 |
| JP | A 2001-358899 | 12/2001 |
| JP | A 2002-234188 | 8/2002 |
| JP | A 2002-257210 | 9/2002 |
| JP | A-2004-63080 | 2/2004 |
| JP | A 2004-193880 | 7/2004 |
| JP | A 2006-007606 | 1/2006 |

* cited by examiner

*Primary Examiner*—Houshang Safaipour
(74) *Attorney, Agent, or Firm*—Oliff & Berridge, PLC

(57) ABSTRACT

A transmission including: a sun gear forwardly and reversely rotatable by a driving force; a rotary member being forwardly and reversely rotatable, and having a projecting portion; a clutch causing the rotary member to be forwardly rotated and reversely rotated, and not causing the rotary member to be reversely rotated when a predetermined torque is applied; a planetary gear rotatably supported by the rotary member, meshed with and revolved around the sun gear, and rotated by a rotation of the sun gear; a transmission gear meshed with the planetary gear and rotated when the planetary gear is positioned at a predetermined revolution position; a stopper inhibiting the rotary member from being reversely rotated at a rotation position; a switch including a switch lever which the projecting portion contacts when the rotary member is rotated, and detecting a rotational position of the rotary member, the switch permitting the swinging of the switch lever caused by the projecting portion when the rotary member is forwardly rotated and restricting the swinging of the switch lever caused by the projecting portion when the rotary member is reversely rotated; and a saving mechanism saving the switch lever from being forcedly swung when the rotary member is reversely rotated.

8 Claims, 24 Drawing Sheets

TRANSMISSION AND COMMUNICATION APPARATUS INCLUDING THE SAME

CROSS REFERENCE TO RELATED APPLICATION

The present application claims priority from Japanese Patent Application No. 2006-255292, which was filed on Sep. 21, 2006, the disclosure of which is herein incorporated by reference in its entirety.

BACKGROUND OF THE INVENTION

1. Field of the Invention

The present invention relates to a transmission in which a driving force of a driving source is transmitted to a transmission gear via a sun gear and a planetary gear and, in particular, to a transmission including a switch that detects a rotation position of a rotary member for revolving the planetary gear. Further, the present invention relates to a communication apparatus including the transmission.

2. Discussion of Related Art

For example, in a communication apparatus such as a facsimile apparatus, there is adopted a configuration in which a driving force of one motor is transmitted to selected one of a plurality of driving portions. These driving portions correspond to various actions, e.g., feeding of a document or a recording sheet, reading of an image of the document, or recording the image onto the recording sheet. There is adopted a transmission as a mechanism for selectively transmitting the driving force. There has conventionally been a transmission in which a driving force of a motor is transmitted to a transmission gear via a sun gear and a planetary gear, as disclosed by Patent Document 1 (JP-A-2002-257210) or Patent Document 2 (JP-A-2006-7606).

In FIGS. 22, 23 and 24, there is shown a manner of switching or changing driving-force transmitting modes in a conventional transmission. Two-planetary gears 201, 202 are rotatably supported by a cam plate 200 as a rotary member. The cam plate 200 has a generally circular-disk shape and is rotated about its center as a rotation axis. Each of the planetary gears 201, 202 supported by the cam plate 200 is revolved with a rotation of the cam plate 200. Although not shown in FIGS. 22 through 24, a sun gear is provided so as to be coaxial with the cam plate 200. When a driving force is transmitted from the sun gear to the cam plate 200 via a clutch, the cam plate 200 is rotated counterclockwise (hereinafter, called as "a forward rotation" or described a "forwardly rotated") or rotated clockwise (hereinafter, called as "a reverse rotation" or described as "reversely rotated"). Further, the sun gear and each of the planetary gears 201, 202 are meshed with each other. Therefore, the respective planetary gears 201, 202 can be revolved around the sun gear, and can also be rotated by the driving force transmitted from the sun gear.

At five predetermined positions around the cam plate 200, there are respectively provided five transmission gears 203, 204, 205, 206, 207. Depending on a rotation position of the cam plate 200, one of the transmission gears 203-207 is meshed with one of the planetary gears 201, 202. For instance, at a rotation position of the cam plate 200 shown in FIG. 22, the planetary gear 201 is meshed with the transmission gear 203 for thereby transmitting the driving force therebetween; and at a rotation position of the cam plate 200 shown in FIG. 23, the planetary gear 202 is meshed with the transmission gear 205 for thereby transmitting the driving force therebetween. The cam plate 200 is provided with a stopper 208. When the stopper 208 is engaged with a hole of a frame, not shown, whereby the cam plate 200 is stopped at a predetermined rotation position.

In a peripheral portion of the cam plate 200, there are provided a plurality of projecting portions 209, 210. The cam plate 200 includes six projecting portions. However, in each drawing, reference numerals are used to designate only two of the six projecting portions that are actually shown. A switch 212 is disposed adjacent to the cam plate 200. A switch lever 213 of the switch 212 is swung or pivoted by each of the projecting portions 209, 210. Owing to a swing of the switch lever 213, the switch 212 is turned ON, i.e., the switch 212 is in an ON state. A rotation position of the cam plate 200 is judged on the basis of the ON/OFF state of the switch 212 and a number of pulses generated in a pulse motor (not shown) functioning as a driving source.

As shown in FIGS. 22 and 23, when the cam plate 200 is rotated counterclockwise (i.e., forwardly rotated) in the conventional transmission, the changing of the driving-force transmitting modes, namely, the changing of combinations of one of the planetary gears 201, 202 and one of the transmission gears 203 through 207 between which the driving force is transmitted, is conducted. Further, as shown in FIGS. 22 and 23, when the cam plate 200 is rotated clockwise (i.e., reversely rotated) in the conventional transmission, the driving force is transmitted between an appropriate one of the planetary gears 201, 202 and an appropriate one of the transmission gears 203 through 207. For instance, when the cam plate 200 is rotated from the rotation position shown in FIG. 22 to the rotation position shown in FIG. 23, the driving-force transmitting mode in which the planetary gear 201 and the transmission gear 203 are meshed with each other is switched or changed to the driving-force transmitting mode in which the planetary gear 202 and the transmission gear 205 are then meshed with each other.

A rotation direction of the cam plate 200 is changed from the forward rotation to the reverse rotation, or vice versa, when a rotation direction of the pulse motor is changed likewise. A timing for changing the rotation direction of the cam plate 200 is controlled on the basis of the ON/OFF state of the switch 212 and the number of pulses of the pulse motor as the driving source.

SUMMARY OF THE INVENTION

In the above-described conventional transmission, the changing of the rotation direction of the pulse motor may not be conducted at a proper timing, due to an influence of electrical noise or the like. As shown in FIG. 24, the projecting portion 210 of the cam plate 200 may collide with the switch lever 213 of the switch 212 in a reverse direction (i.e., in a direction in which the cam plate 200 is reversely rotated), if the cam plate 200 is reversely rotated before having been stopped by the stopper 208 after forwardly rotated up to a predetermined rotation position. The switch lever 213 of the switch 212 is configured such that the switch lever 213 can be swung by a collision with each one of the projecting portions 209, 210 that is moved in a forward direction (i.e., in a direction in which the cam plate 200 is forwardly rotated). Thus, the switch 212 may be damaged due to a collision with each projecting portion 209, 210 moved in the reverse direction.

The present invention has been developed in view of the background discussed above. It is therefore an object of the present invention to provide a transmission in which a switch is not damaged even if a timing control may not be properly conducted, and to provide a communication apparatus including the transmission.

A transmission according to the present invention includes: (A) a sun gear forwardly and reversely rotatable by a driving force transmitted from a driving source; (B) a rotary member provided to be forwardly and reversely rotatable about a same rotation axis as a rotation axis of the sun gear, and having a projecting portion projecting radially outwardly at a predetermined position thereof, a clutch configured to cause the rotary member to be forwardly rotated by a forward rotation of the sun gear and reversely rotated by a reverse rotation of the sun gear, and not to cause the rotary member to be reversely rotated when a load having a predetermined torque is applied to the rotary member; (D) a planetary gear which is rotatably supported by the rotary member, meshed with the sun gear, revolved around the sun gear by a rotation of the rotary member, and rotated by a rotation of the sun gear in a case in which the rotation of the rotary member is inhibited; (E) a transmission gear which is meshed with the planetary gear and rotated by a rotation thereof when the planetary gear is positioned at a predetermined revolution position thereof, (F) a stopper configured to inhibit the rotary member from being reversely rotated at a first rotation position thereof where the planetary gear is positioned at the predetermined revolution position; (G) a switch including a switch lever which the projecting portion contacts when the rotary member is rotated, and being configured to detect, by utilizing a swinging of the switch lever, a second rotation position of the rotary member based on which the rotation of the rotary member is changed from a forward rotation thereof to a reverse rotation thereof, the switch being configured to permit the swinging of the switch lever caused by the projecting portion when the rotary member is forwardly-rotated and to restrict the swinging of the switch lever caused by the projecting portion when the rotary member is reversely rotated; and (H) a saving mechanism which saves the switch lever from being forcedly swung by the projecting portion when the rotary member is reversely rotated.

The rotation of the sun gear which is forwardly or reversely rotated is transmitted to the rotary member via the clutch. According to the forward or reverse rotation of the sun gear, the rotary member is forwardly or reversely rotated. When the rotary member is forwardly or reversely rotated, the planetary gear is revolved about the rotation axis of the sun gear. Owing to this revolution of the planetary gear, the planetary gear is meshed with or removed from the transmission gear. In a case in which a load larger than the predetermined torque is applied when the clutch transmits the reverse rotation of the sun gear to the rotary member, the clutch is slipped without transmitting the rotation of the sun gear to the rotary member. That is, the sun gear is reversely rotated and the rotation thereof is transmitted to the planetary gear, whereas the rotary member is stopped.

The stopper inhibits the rotary member, at a predetermined rotation position, from being rotated in a reverse direction. The predetermined rotation position is, for example, a position where the planetary gear is meshed with the transmission gear, or where the planetary gear is removed from the transmission gear. Owing to a stopping force of the stopper, the clutch for transmitting the reverse rotation of the sun gear is slipped, so that the rotary member being reversely rotated is stopped at the predetermined rotation position. By the rotation position of the rotary member that is determined by the stopper, the planetary gear is controlled to be meshed with or removed from the transmission gear.

The rotary member has the projecting portion and a non-projecting portion at respective predetermined positions thereof. That is, the projecting portion and the non-projecting portion are disposed on the rotary member. When the rotary member is forwardly rotated, the projecting portion contacts the switch lever, so that the switch lever swings. Owing to this swinging of the switch lever, the switch is brought into an ON state or an OFF state, so that an appropriate electric signal is generated. Accordingly, the projecting portion of the rotary member is detected. Since the projecting portion and the non-projecting portion are disposed on the rotary member, the rotation position of the rotary member is judged, for example, on the basis of a timing for detecting the projecting portion. Since the projecting portion is detected when the rotary member is forwardly rotated, the rotary member can be forwardly rotated to a desired rotation position.

When the rotary member is reversely rotated after having been forwardly rotated slightly over a rotation position where the rotary member is to be stopped by the stopper, the stopper stops the rotary member at the rotation position. In a case in which the planetary gear is meshed with the transmission gear at the rotation position, the rotation of the sun gear is transmitted to the transmission gear via the planetary gear.

If the rotary member is not stopped by the stopper when reversely rotated and the projecting portion of the rotary member contacts the switch lever, the switch lever is saved from swinging by the saving mechanism. According to this arrangement, even when the rotary member is reversely rotated before having been stopped by the stopper and the projecting portion of the rotary member contacts the switch lever, the switch lever is prevented from being forcibly swung in a reverse direction oppose to a forward direction in which the switch lever is mg when contacting the projecting portion of the rotary member that is forwardly rotated.

In the transmission according to the present invention, the saving mechanism saves the switch lever from swinging in a case in which the projecting portion of the rotary member contacts the switch lever when the rotary member is reversely rotated, whereby the switch lever is prevented from being forcibly swung in the reverse direction. Accordingly, a breakage of the switch is prevented even when the rotary member is improperly operated due to electric noise or the like.

BRIEF DESCRIPTION OF THE DRAWINGS

The above and optional objects, features, and advantages of the present invention will be better understood by reading the following detailed description of preferred embodiments of the invention when considered in conjunction with the accompanying drawings, in which.

DETAILED DESCRIPTION OF THE PREFERRED EMBODIMENTS

Hereinafter, there will be described a preferred embodiment of the present invention by reference to the drawings. A transmission according to the present invention may be configured as a part of a communication apparatus. For example, a facsimile apparatus typifies the communication apparatus. In the facsimile apparatus, the transmission transmits a driving force corresponding to each action, such as reading of an image of a document, recording of the image onto a recording sheet, or the like In the present embodiment, a transmission is adopted in a facsimile apparatus. However, the transmission according to the present invention may be adopted in other apparatuses other than the facsimile apparatus.

Figure 1:
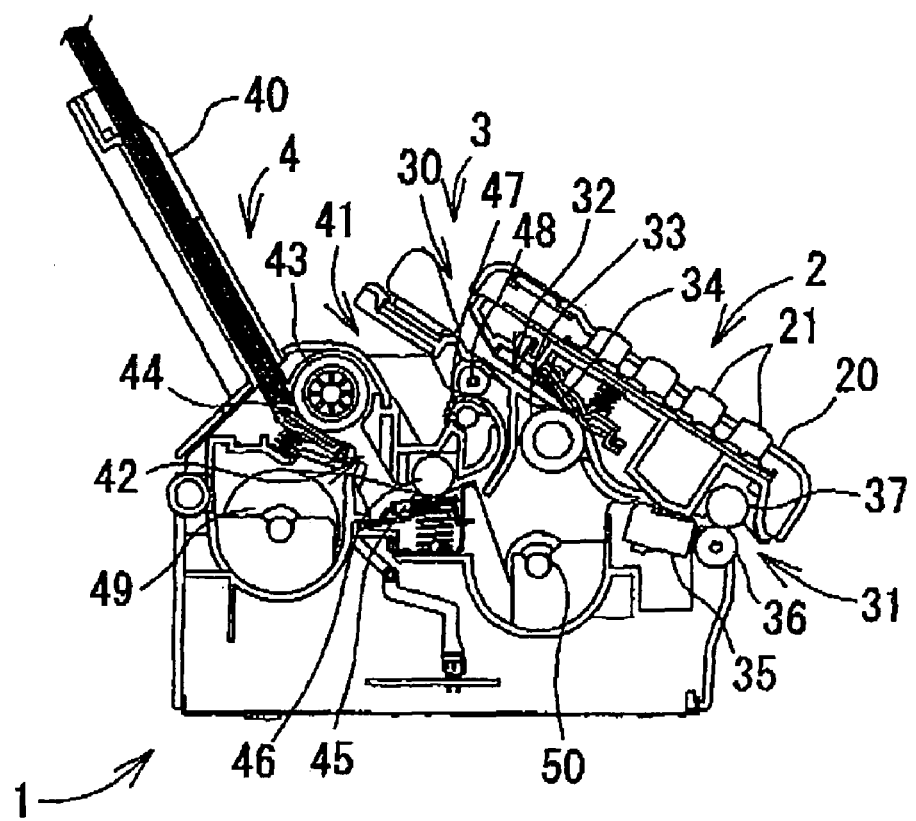
FIG. 1 is a cross-sectional view showing an inner configuration of a facsimile apparatus as one embodiment of the present invention.

FIG. 1 is a cross-sectional view showing an inner configuration of a facsimile apparatus 1. The facsimile apparatus 1 is configured to send and receive electric signals to and from a remote communication apparatus via a telephone line or the like. In the facsimile apparatus 1, electric signals are converted into images, voices (sounds), etc., or vice versa. The facsimile apparatus 1 includes an operable section 2, an image reading section 3, and an image recording section 4 which roughly correspond to respective functions of the facsimile apparatus 1. It is noted that, throughout the specification, directional terminology such as "front", "rear", "left", "right", "upper", "flower", "above", "below", etc., is used with respect to an orientation of the facsimile apparatus 1 disposed for its intended use.

The operable section 2 is provided in a front portion (i.e., a right portion in FIG. 1) of the facsimile apparatus 1. The operable portion 2 includes an operation panel 20 functioning as an upper cover of the facsimile apparatus 1 and having a button 21, a liquid crystal display, etc. The operable section 2 has a common configuration as used in a conventional facsimile apparatus, and a detailed explanation thereof is dispensed with. It is noted that the liquid crystal display is not shown in FIG. 1. The facsimile apparatus 1 is operated on the basis of commands inputted through the operable section 2.

In the image reading section 3, the image of the document to be sent in facsimile is read. A document-introducing opening 30 is provided on an upper side of the operation panel 20. A document-discharging opening 31 is provided on a lower side of the operation panel 20. A document-carrying path 32 is formed between the document-introducing opening 30 and the document-discharging opening 31. In the document-carrying path 32, there are disposed a document-supplying roller 33, a document-separating plate 34, an image sensor 35, a document-discharging roller 36 and a pinch roller 37. The document-supplying roller 33 and the document-discharging roller 36 are rotated by a driving force transmitted by a later-described transmission 10. It is noted that, in the image reading section 3, the document-supplying roller 33, the document-charging roller 36, etc., constitute a document-carrying portion.

The document-supplying roller 33 and the document-separating plate 34 are disposed in a vicinity of the document-introducing opening 30 so as to be opposed to each other. The document-separating plate 34 is held in pressed contact with an outer surface of the document-supplying roller 33. By the document-supplying roller 33 and the document-separating plate 34, the uppermost one of the documents inserted into the document-introducing opening 30 is separated and carried in the document-carrying path 32 toward the document-discharging opening 31.

The image sensor 35 is disposed in the document-carrying path 32 between the document-supplying roller 33 and the document-discharging roller 36. The image sensor 35 is configured by a plurality of photoelectric transducers arranged on one line, and generally called as a Contact Image Sensor. The image of the document carried in the document-carrying path 32 is read by the image sensor 35. Image data outputted from the image sensor 35 are converted into electric signals on the basis of a prescribed communication protocol, and these signals are sent to another communication apparatus via a telephone line.

The document-discharging roller 36 and the pinch roller 37 are disposed in a vicinity of the document-discharging opening 31 so as to be opposed to each other. The pinch roller 37 is held in pressed contact with the document-discharging roller 36, and is rotated to follow a rotation of the document-discharging roller 36. The document from which the image is read by the image sensor 35 is pinched by the document-supplying roller 33 and the document-separating plate 34 with respect to an upstream side portion of the document in a direction in which the document is carried, and pinched by the document-discharging roller 36 and the pinch roller 37 with respect to a downstream side portion of the document in the same direction. Thus, the document is carried to the document-discharging opening 31.

In the image recording section 4, an image is recorded on the basis of facsimile signals received. In a rear portion of the facsimile apparatus 1 (i.e., a left portion in FIG. 1), there is provided a sheet tray 40. In the sheet tray 40, a plurality of recording sheets are accommodated. A sheet-discharging opening 41 is provided between the sheet tray 40 and the document-introducing opening 30. A sheet-carrying path 42 is formed between the sheet tray 40 and the sheet-discharging opening 41. As seen in FIG. 1, the sheet-carrying path 42 is a curved path having a U-shaped portion in which the sheet makes a U-turn upwardly. In the sheet-carrying path 42, there are provided a sheet-supplying roller 43, a sheet-separating plate 44, a thermal head 45, a platen roller 46, a sheet-discharging roller 47 and a pinch roller 48. The sheet-supplying roller 43, the platen roller 46 and the sheet-discharging roller 47 are rotated by the driving force transmitted by the transmission 10. It is noted that, in the image recording section 4, the sheet-supplying roller 43, the platen roller 46, the sheet-discharging roller 47, etc., constitute a sheet-carrying portion.

The sheet-supplying roller 43 and the sheet-separating plate 44 are disposed on a downstream side of the sheet tray 40 so as to be opposed to each other. The sheet-separating plate 44 is held in pressed contact with an outer surface of the sheet-supplying roller 43. By the sheet-supplying roller 43 and the sheet-separating plate 44, the uppermost one of the recording sheets accommodated in the sheet tray 40 is separated and carried in the sheet-carrying path 42 toward the sheet-discharging opening 41.

The thermal head 45 and the platen roller 46 are disposed in the sheet-carrying path 42 between the sheet-supplying roller 43 and the sheet-discharging roller 47 so as to be opposed to each other. The thermal head 45 is configured by a plurality of heater elements arranged on one line. A later-described ink ribbon 49 is heated by the thermal head 45 and is brought into pressed contact with the recording sheet by the platen roller 46, so that an ink is transferred onto the recording sheet. Electric signals received by the facsimile apparatus 1 are converted into printing data, and the image is recorded on the recording sheet, based on these printing data, by the thermal head 45.

The sheet-discharging roller 47 and the pinch roller 48 are disposed in a vicinity of the sheet-discharging opening 41 so as to be opposed to each other. The pinch roller 48 is held in pressed contact with the sheet-discharging roller 47, and is rotated to follow a rotation of the sheet-discharging roller 47. The recording sheet on which the image is recorded by the thermal head 45 is pinched by the sheet-supplying roller 43 and the sheet-separating plate 44 with respect to an upstream-side portion of the recording sheet in a direction in which the document is carried, and pinched by the sheet-discharging roller 47 and the pinch roller 48 with respect to a downstream-side portion of the recording sheet in the same direction. Thus, the recording sheet is carried to the sheet-discharging opening 41.

In a vicinity of the thermal head 45, there are disposed the ink ribbon 49 and a spool 60. The film-like ink ribbon 49 is rolled up around a cylindrical core. The ink ribbon 49 is fed out from the roll, interposed between the thermal head 45 and the platen roller 46, and rolled up by the spool 60. The spool 50 is rotated by the driving force transmitted by the transmission 10 (i.e., by the driving-force transmitting conducted by the transmission 10).

Hereinafter, there will be described the transmission 10 according to the present invention. In the facsimile apparatus 1, the transmission 10 changes the driving-force transmitting modes according to actions or operations of the facsimile apparatus 1. The facsimile apparatus 1 conducts a reading of an image from a document in a facsimile sending operation, a recording of an image onto a recording sheet in a facsimile receiving operation, and a reading and a recording of an image in a copying operation.

Figure 2:
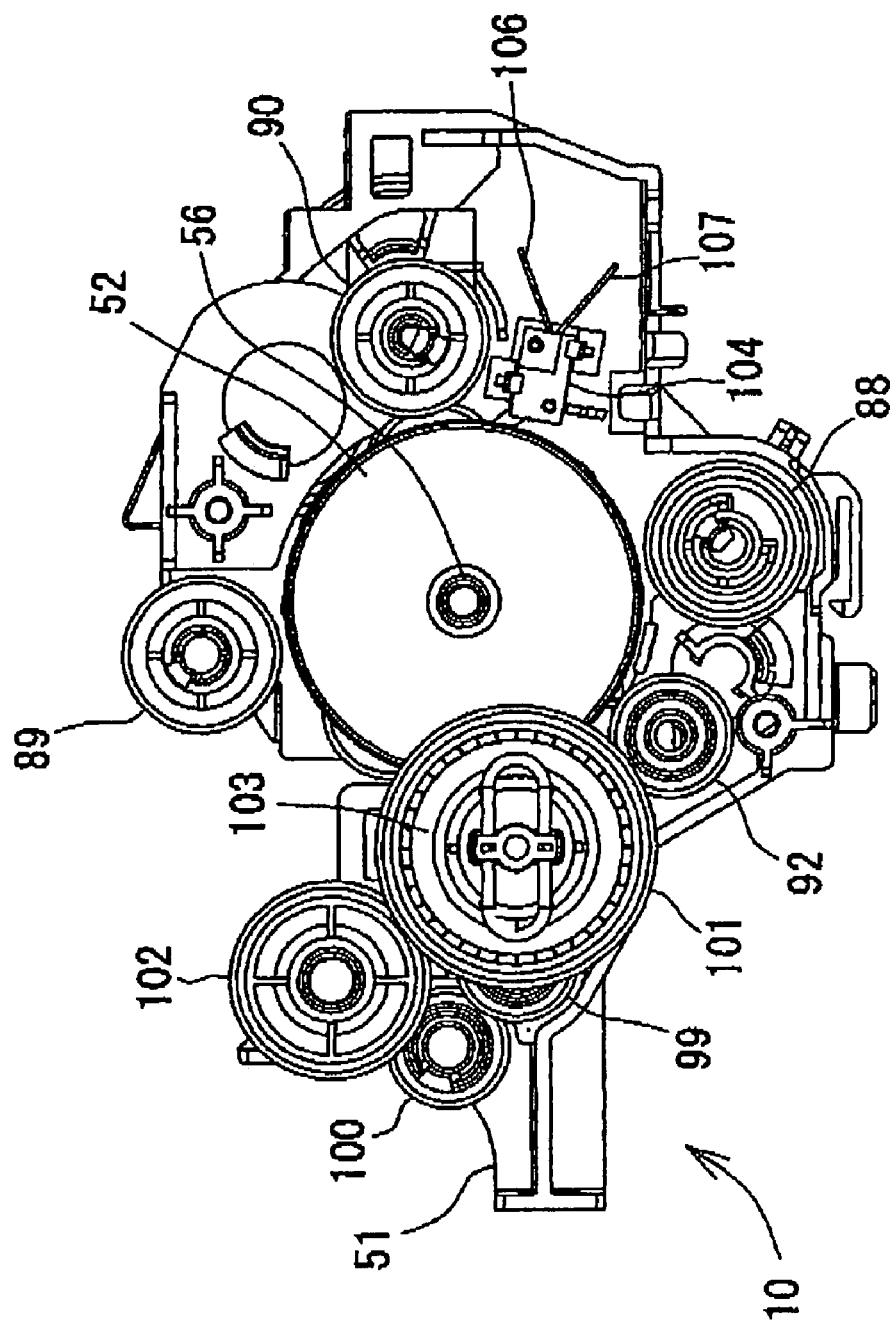
FIG. 2 is a front elevation view showing a configuration of a transmission.
Figure 3:
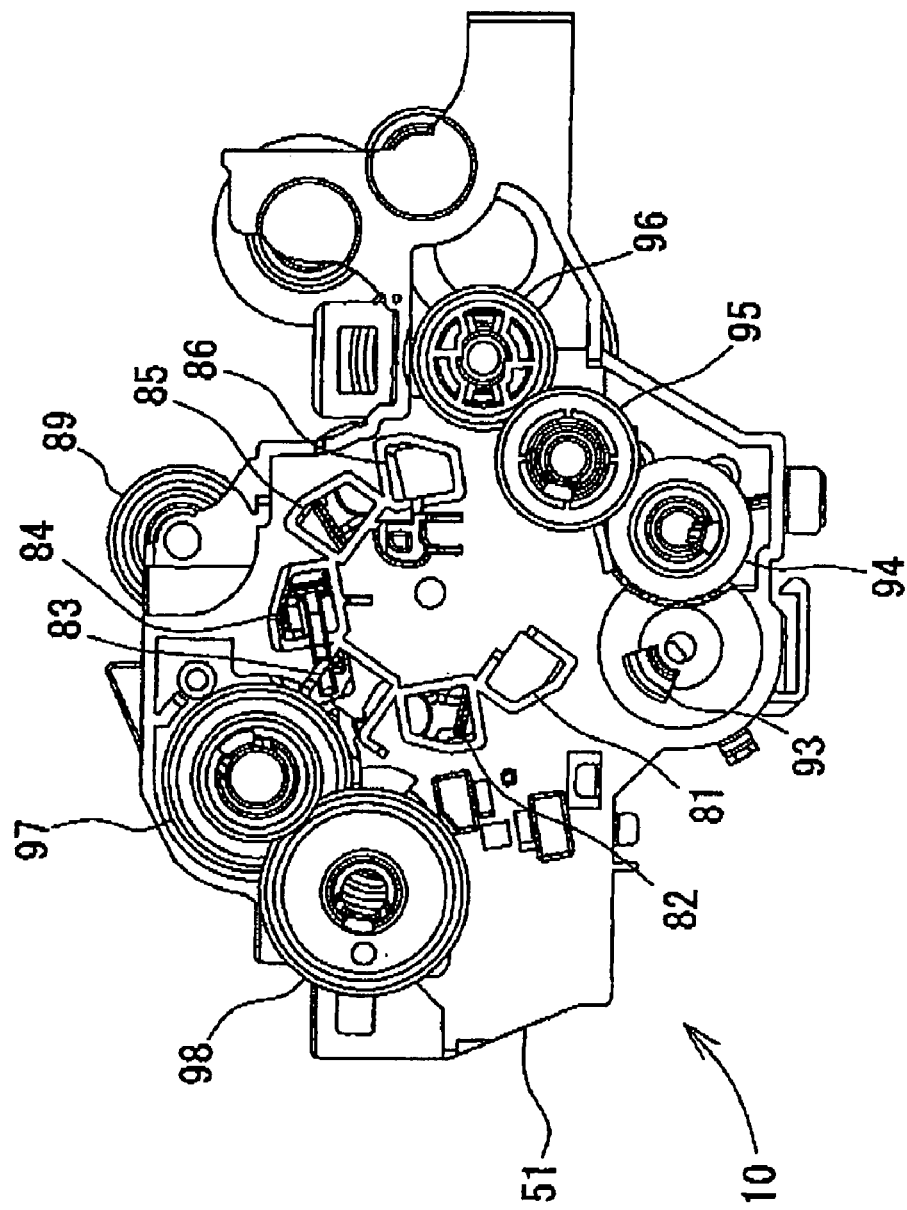
FIG. 3 is a rear elevation view showing the configuration of the transmission.

FIG. 2 is a front elevation view showing a configuration of the transmission 10; and FIG. 3 is a rear elevation view showing the configuration of the transmission 10. The transmission 10 is employed in the facsimile apparatus 1, and transmits the driving force to the document-supplying roller 33, the document-discharging roller 36, the sheet-supplying roller 43, the platen roller 46, the sheet-discharging roller 47 and the spool 50. It is noted that the transmission 10 is not shown in FIG. 1.

As shown in FIGS. 2 and 3, the transmission 10 includes a frame 51 which supports various gears, etc. The frame 51 has a shape which is appropriate for supporting respective shafts of the various gears, respective components or the like, and has, e.g., a plate-like shape.

Initially, there will be described a sun gear 62 according to the present invention. As shown in FIG. 2, the sun gear 52 is rotatably provided in a central portion of the frame 51. The sun gear 52 is meshed with a drive gear 54 provided on a driving shaft of a pulse motor 53 (shown in FIG. 5). It is noted that the pulse motor 53 is not shown in FIGS. 2 and 3. The pulse motor 53 is an example of a driving source. The pulse motor 53 is forwardly and reversely rotated by an appropriate driving voltage being given. The forward and reverse rotation of the pulse motor 53 is transmitted to the sun gear 52 via the drive gear 54, so that the sun gear 52 is forwardly and reversely rotated.

Figure 4:
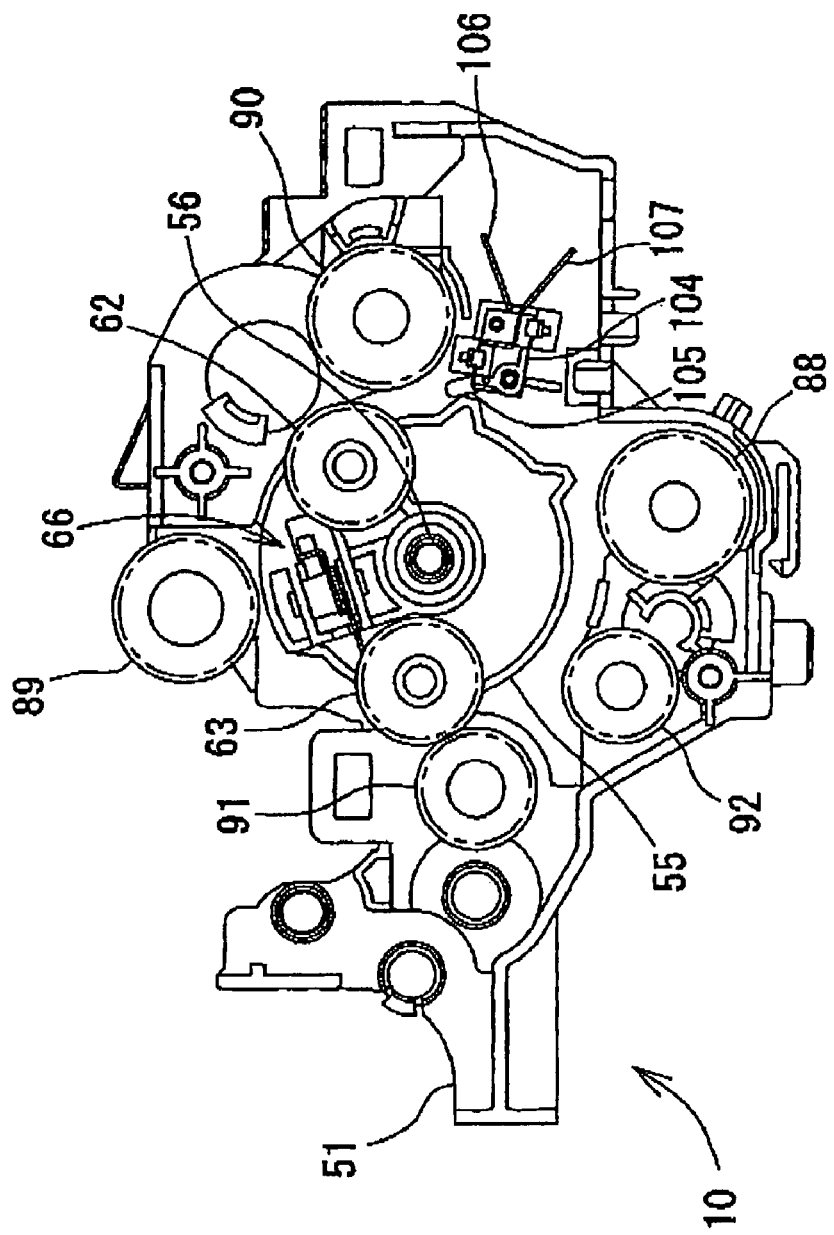
FIG. 4 is a plan view showing the transmission from which a sun gear, etc., are removed.
Figure 5:
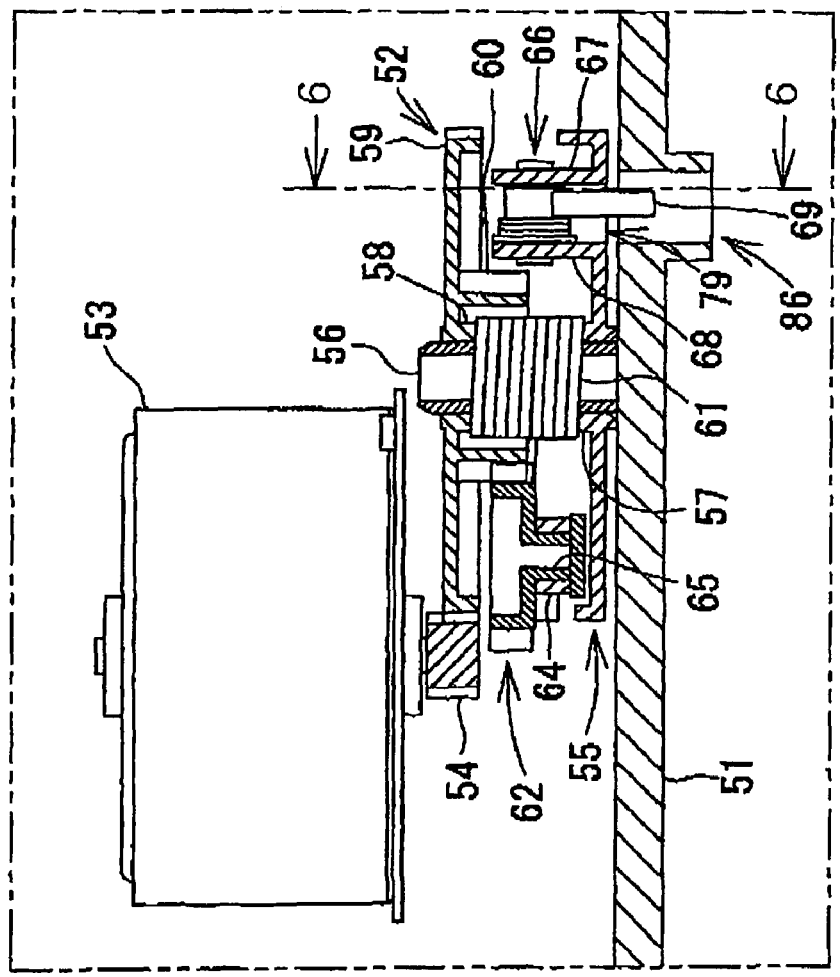
FIG. 5 is a partial cross-sectional view showing a transmitting mechanism in which a driving force is transmitted from the sun gear to a cam plate as a rotary member.

FIG. 4 is a plan view showing the transmission 10 from which the sun gear 52, etc., are removed FIG. 5 is a partial cross-sectional view showing a transmitting mechanism through which the driving force is transmitted from the sun gear 62 to a cam plate 55. It is noted that, in FIG. 4, respective transmission gears 88, 89, 90, 91, 92 are roughly shown.

Next, there will be described the cam plate 55 as a rotary member according to the present invention. In FIG. 2, the cam plate 55 is rotably provided below the sun gear 52 on the frame 51. However, in FIG. 2, the cam plate 55 does not appear since the cam plate 55 is disposed behind the sun gear 62. As shown in FIG. 5, a support shaft 56 is formed on the frame 51. The sun gear 52 and the cam plate 65 are arranged in a direction in which the support shaft 56 extends, and are supported by the support shaft 56. Therefore, the sun gear 52 and the cam plate 55 are coaxial with each other and rotatable about the support shaft 56.

Figure 8:
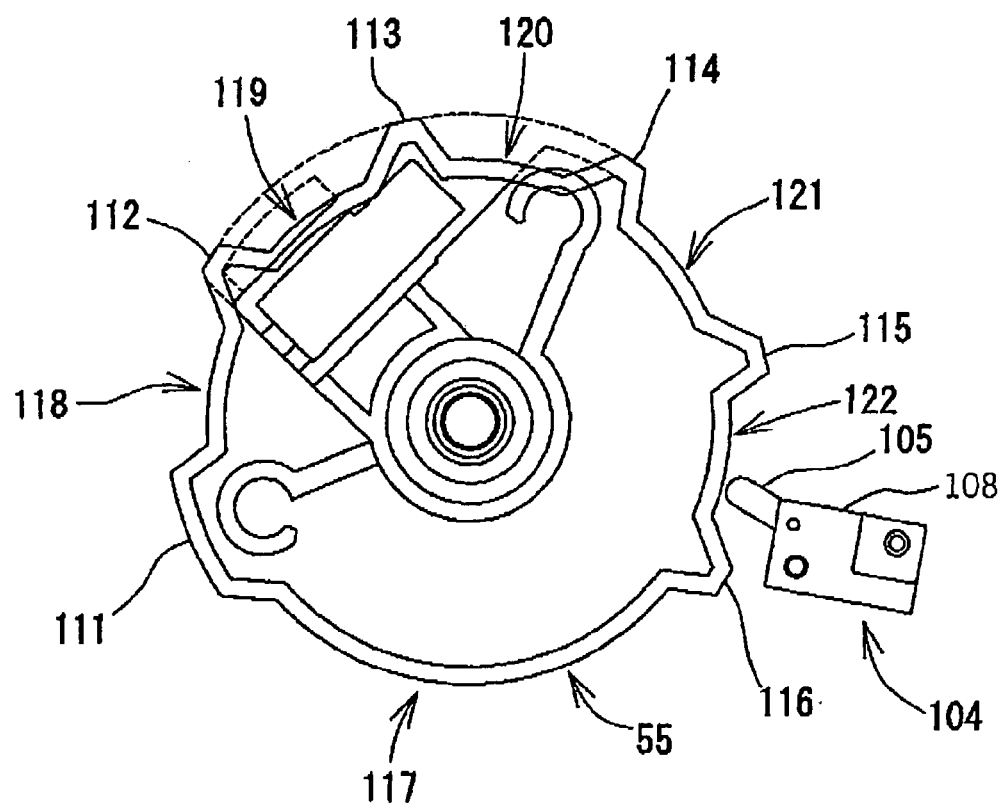
FIG. 8 is a plan view showing a configuration of the cam plate.

As shown in FIG. 8, the cam plate 55 has a generally disc-like shape. At respective specific positions in an outer periphery of the cam plate 55, there are formed projecting portions 111, 112, 113, 114, 115, 116 and non-projecting portions 117, 118, 119, 120, 121, 122. The projecting portions 111 through 116 project in a radial direction of the cam plate 55. There will be more specifically described the projecting portions 111 through 116 and the non-projecting portions 117 through 122. It is noted that the projecting portions and the non-projecting portions are formed in the outer periphery of the cam plate 55 in the present embodiment, but the projecting portions and the non-projecting portions may be formed at predetermined positions other than the outer periphery of the cam plate 55 in the present invention. As shown in FIG. 5, in a central portion of the cam plate 55, there is formed a cylindrical portion (boss) 57 which fits on the support shaft 56. The cylindrical portion 57 projects toward the sun gear 52.

In a central portion of the sun gear 52, there is formed a cylindrical portion (boss) 58 which fits on the support shaft 56. The cylindrical portion 68 projects toward the cam plate 55. The sun gear 52 and the cam plate 55, supported by the support shaft 57, are independently rotatable in a state in which the cylindrical portions 57, 58 contact each other. The gear 62 has a second gear portion 60 having a cylindrical shape whose diameter is larger than a diameter of the cylindrical portion 58 such that the cylindrical portion 58 is inserted into the second gear portion 60, namely, such that the outer periphery of the cylindrical portion 58 and the inner periphery of the second gear portion 60 are spaced apart from each other with a predetermined distance. That is, the sun gear 52 is a two-speed gear including a first gear portion 59 having a major diameter and the second gear portion 60 having a minor diameter. The first gear portion 59 is meshed with the drive gear 54 of the pulse motor 53. A speed of rotation is varied on the basis of a gear ratio between the first gear portion 59 and the second gear portion 60, and transmitted by the sun gear 52.

Next, there will be described a clutch spring 61 as a clutch according to the present invention. The clutch spring 61 fits on the cylindrical portion 58 of the sun gear 52 and the cylindrical portion 57 of the cam plate 55. The clutch spring 61 is arranged for transmitting the rotation of the sun gear 52 to the cam plate 55.

The clutch spring 61 is made of a band-like spring steel coiled up into a coiled shape. The clutch spring 61 fits on the cylindrical portions 57, 58 in a state in which a diameter of the coiled-shaped clutch spring is slightly enlarged, namely, the clutch spring 61 is elastically deformed such that the diameter thereof is enlarged. Therefore, the clutch spring 61 is elastically restored such that the diameter thereof is decreased, so that the clutch spring 61 is brought into pressed contact with the cylindrical portions 57, 68. The clutch spring 61 having the coiled shape is coiled up in a direction in which the diameter thereof is decreased when the sun gear 52 is rotated counterclockwise in FIG. 2. In other words, the diameter of the coiled-shaped clutch spring 61 is enlarged when the sun gear 52 is rotated clockwise in FIG. 2. When the diameter of the clutch spring 61 is decreased, the clutch spring 61 is more strongly held in pressed contact with the cylindrical portions 57, 58. Accordingly, the driving force is reliably transmitted from the sun gear 52 to the cam plate 55 with a strong torque applied to the cam plate 55.

When the diameter of the clutch spring 61 is enlarged, the clutch spring 61 is pressed with a decreased force on the cylindrical portions 57, 58. The driving force is transmitted from the sun gear 52 to the cam plate 55 with an appropriate torque, through the diameter of the clutch spring 61 is enlarged when the sun gear 52 is rotated clockwise. As described above, as compared with the case in which the sun gear 52 is rotated counterclockwise, the clutch spring 61 is pressed with the decreased force on the cylindrical portions 57, 58 in the case where the sun gear 52 is rotated clockwise. Therefore, the torque with which the driving force is transmitted from the sun gear 52 to the cam plate 65 is decreased. Accordingly, if the rotation of the cam plate 55 is stopped by a load larger than the decreased torque, the clutch spring 61 is slipped with respect to the cylindrical portions 57, 58. That is, the sun gear 52 is slipped with respect to the cam plate 55 and rotated clockwise.

It is noted that, in the present embodiment, a counterclockwise rotation of the sun gear 52 shown in FIG. 2 is referred to as the "forward rotation" and a clockwise rotation of the sun gear 52 shown in FIG. 2 is referred to as the "reverse rotation". However, the forward rotation and the reverse rotation are a relative concept, whereby the clockwise rotation shown in FIG. 2 may be optionally referred to as either of the forward rotation or the reverse rotation.

Next, there will be described two planetary gears 62, 63 according to the present invention. In the present embodiment, the number of the planetary gears is two, for example. However, the number of the planetary gears is not limited in the present invention. As shown in FIG. 4, the two planetary gears 62, 63 are rotatably supported by the cam plate 55. It is noted that the planetary gear 63 is not shown in FIG. 5. Although respective positions of the planetary gears 62, 63 with respect to the rotation direction of the cam plate 55 are different, the planetary gears 62, 63 have the same configuration with which the gears 62, 63 are supported by the cam plate 55. Therefore, it will be described the configuration of the planetary gear 62 only. As shown in FIG. 5, in the cam plate 65, there are formed half-cylindrical portions 64, 64 for supporting shafts 65 of the planetary gears 62, 63. Each of the half-cylindrical portions 64, 64 has a C-shaped cross-section. A shaft 65 of the planetary gear 62 is inserted into the half-cylindrical portion 64 and rotatably supported thereby. The shaft 65 extends in a direction parallel to a direction in which the rotation axis of the sun gear 52 extends, in a state in which the planetary gear 62 is supported by the half-cylindrical portion 64. Further, the planetary gear 62 is meshed with the second gear portion 60 of the sun gear 52.

As shown in FIG. 4, the planetary gear 63 is rotatably supported by the cam plate 55 at a position different from the position of the planetary gear 62. As described above, the planetary gear 63 has the same configuration, as the configuration of the planetary gear 62, with which the planetary gear 63 is supported by the cam plate 55. Further, the planetary gear 63 is also meshed with the second gear portion 60 of the sun gear 52. The planetary gears 62, 63 are respectively located at different positions with respect to the rotation direction of the cam plate 55. The positions of the planetary gears 62, 63 respectively correspond to dispositions of the transmission gears 88 through 92 which are disposed around the cam plate 55. When the cam plate 55 is rotated, the planetary gears 62, 63 are accordingly revolved. Since the cam plate 55 is coaxial with the sun gear 52, the planetary gears 62, 63 are revolved about the rotation axis of the sun gear 52 by the rotation of the cam plate 55 in a state in which the planetary gears 62, 63 are meshed with the second gear portion 60 of the sun gear 52. When the sun gear 52 is rotated, the planetary gears 62, 63 are rotated about respective own axes.

Figure 6:
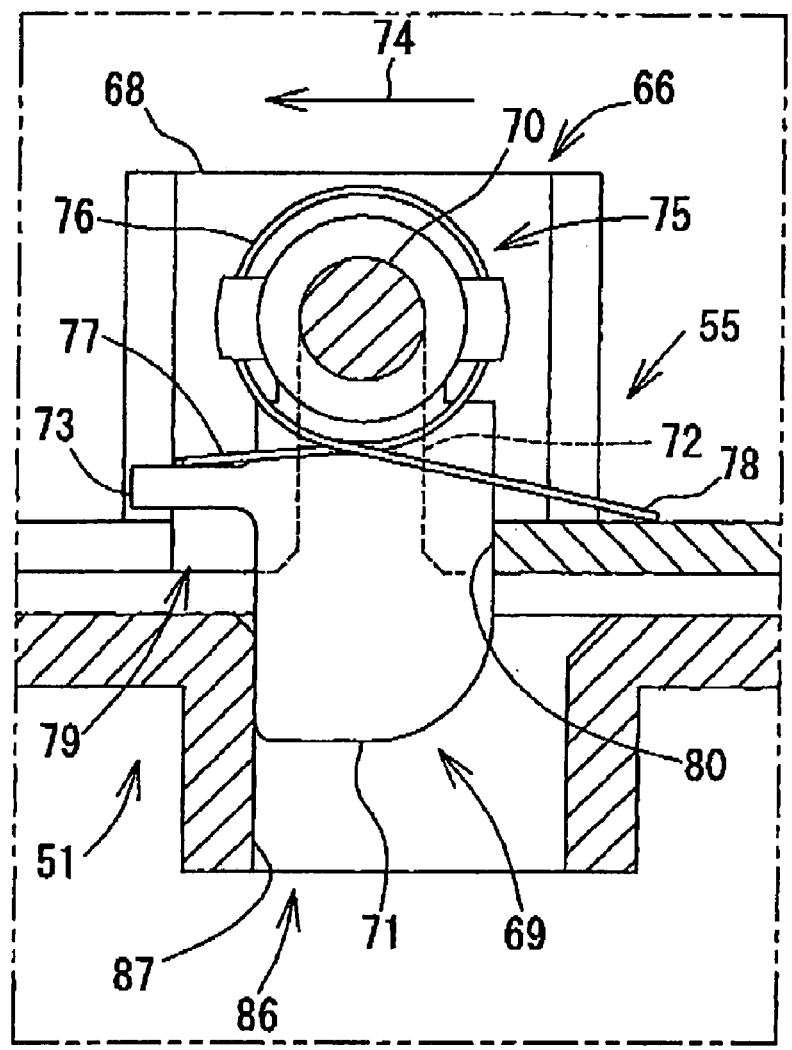
FIG. 6 is an enlarged partial cross-sectional view taken along a line 6-6 shown in FIG. 5.

Next, there will be described a stopper 66 according to the present invention. The stopper 66 is provided for stopping the cam plate 55 at each of predetermined rotation positions when the cam plate 55 is rotated in a clockwise direction (i.e., a direction in which the cam plate 65 is reversely rotated). As shown in FIGS. 4 and 5, the stopper 66 is provided at a specific position on the cam plate 55. FIG. 6 is an enlarged partial cross-sectional view taken along a line 6-6 shown in FIG. 5.

As shown in FIGS. 5 and 6, the cam plate 55 has two support walls 67, 68 that are spaced apart from each other at a predetermined distance in the radial direction of the cam plate 55 and are opposed to each other. A hole 79 is formed through the cam plate 55 in the axial direction thereof at a position corresponding to the space between the two support walls 67, 68. A swinging piece 69 is disposed between the support walls 67, 68. The swinging piece 69 includes a shaft portion 70 projecting in a direction perpendicular to the drawing sheet of FIG. 6 and a plate portion 71 extending in a radial direction of the shaft portion 70. As shown in FIG. 6, the support wall 68 has a cut-out 72 opening in a distal end thereof. Although not shown in FIG. 6, a similar cut-out is formed in the support wall 67. The shaft portion 70 fits into the cut-outs 72 so that the swinging piece 69 is disposed between the support walls 67, 68.

The plate portion 71 of the swing piece 69 disposed between the support walls 67, 68 projects beyond the cam plate 55 through the hole 79. A distal end portion of the plate portion 71 reaches the frame 51. The plate portion 71 has a spring receiver 73. The spring receiver 73 laterally projects from the plate portion 71. A direction in which the spring receiver 73 projects is a direction in which the cam plate 55 is reversely rotated and indicated by an arrow 74 in FIG. 6. A coil portion 76 of a helical torsion spring 75 fits on the shaft portion 70. An arm portion 77 as one of two arm portions of the helical torsion spring 75 extends almost laterally from the shaft portion 70 and is received by the spring receiver 73. An arm portion 78 as the other arm portion of the helical torsion spring 75 extends almost laterally from the shaft portion 70 in a direction opposite to the direction in which the arm portion 77 extends, and is received by a surface of the cam plate 55. The swinging piece 69 is biased by the helical torsion spring 75 in a counterclockwise direction in FIG. 6. The swinging piece 69 biased by the helical torsion spring 75 is inhibited, at a certain rotation position, from being rotated since the plate portion 71 is brought into contact with an inner surface 80 of the hole 79. FIG. 6 shows a state in which the swinging piece 69 is stopped.

Figure 7:
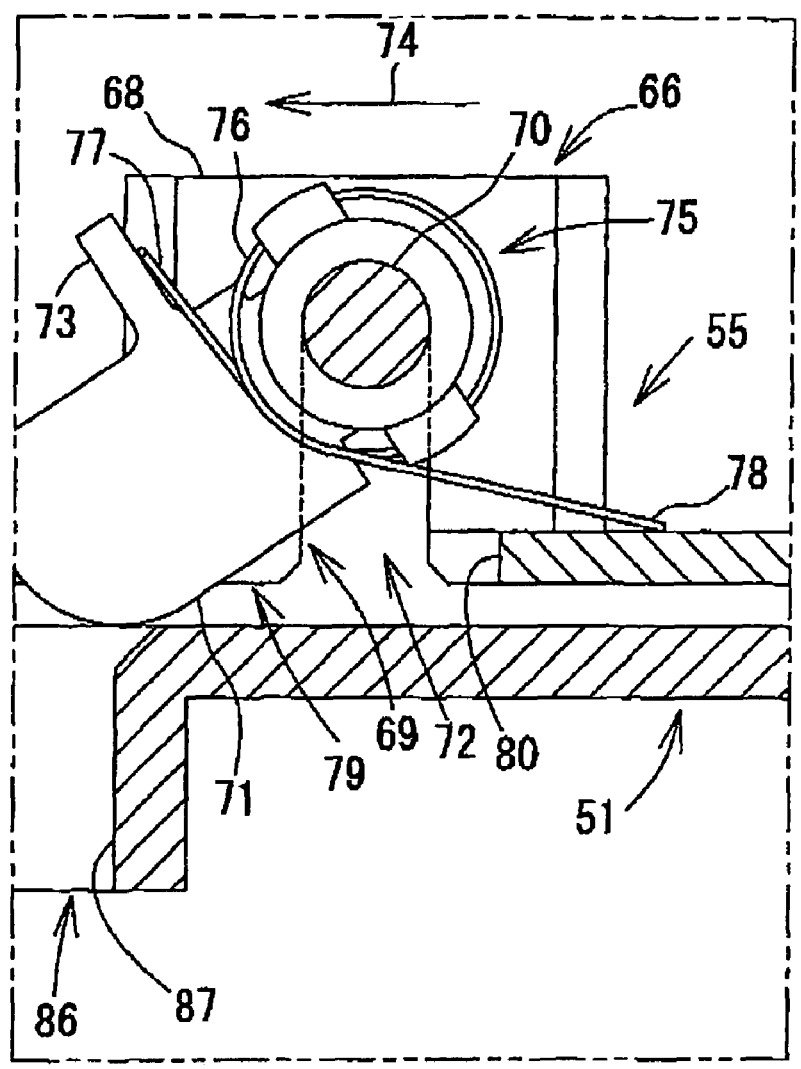
FIG. 7 is an enlarged partial cross-sectional view showing a state in which a swinging piece of a stopper is rotated clockwise.

As shown in FIG. 6, the plate portion 70 of the swinging piece 69 projects beyond the cam plate 55 in the state in which the swinging piece 69 is stopped. When an external force is applied to the swinging piece 69 in the clockwise direction, the swinging piece 69 is rotated against the biasing force of the helical torsion spring 75. FIG. 7 shows a state in which the swinging piece 69 of the stopper 66 is rotated clockwise. As shown in FIGS. 6 and 7, the hole 79 of the cam plate 55 is elongated in a direction indicated by the arrow 74. Therefore, the swinging piece 69 can be rotated clockwise so that the plate portion 71 is accommodated in the hole 79. As shown in FIG. 7, a corner of the plate portion 71 to be brought into contact with the frame 51 is rounded to reduce a friction caused by the contact.

As shown in FIG. 3, six holes 81, 82, 83, 84, 85, 86 are formed through the frame 51. Each of the holes 81 through 86 is provided on a revolution path of the stopper 66 which is revolved when the cam plate 55 is rotated. The hole 86 as one of the holes 81 through 86 is shown in FIG. 6. The hole 86 is formed through the frame 51 in a thickness direction thereof. The hole 86 is surrounded by a tubular wall 87. When the cam plate 55 is rotated and the stopper 66 is revolved to a position corresponding to the position of the hole 86, the plate portion 71 of the swinging piece 69 enters the hole 86. In this state, when a clockwise driving force is applied to the cam plate 55, namely, when the driving force is applied to the cam plate in the direction indicated by the arrow 74, the plate portion 71 engages the tubular wall 87 defining the hole 86. As described above, the swinging piece 69 is not rotated counterclockwise from the rotation position where the swinging piece 69 is in its stopped state. Accordingly, the stopper 66 inhibits the cam plate 55 from being rotated clockwise, i.e., the stopper 66 restricts the reverse rotation of the cam plate 55.

On the other hand, in the state shown in FIG. 6, if a counterclockwise driving force is applied to the cam plate 55, namely, the driving force is applied to the cam plate 55 in a direction opposite to the direction indicated by the arrow 74, the swinging piece 69 is rotated clockwise, as described above. Then, as shown in FIG. 7, the plate portion 71 of the swinging piece 69 is disengaged from the hole 86. Thus, the stopper 66 does not inhibit the cam plate 55 from being rotated counterclockwise, i.e., does not restrict the forward rotation of the cam plate 55. Further, in the state in which the swinging piece 69 of the stopper 66 is disengaged from the hole 86, the stopper 66 does not inhibit the cam plate 55 from being rotated clockwise, i.e., does not restrict the reverse rotation of the cam plate 55.

There will be omitted a detailed description about the other holes 81 through 85 since each of the holes 81 through 85 is similar to the hole 86. Therefore, when the cam plate 55 is forwardly rotated (in a clockwise direction in FIG. 3), the plate portion 71 of the swinging piece 69 of the stopper 66 is advanced into, and retracted from, each of the holes 81 through 86 while the stopper 66 is revolved with the rotation of the cam plate 55. When the driving force is applied to the cam plate 55 in the reverse direction in the state in which the plate portion 71 of the swinging piece 69 is engaged with any one of the holes 81 through 86, the reverse rotation of the cam plate 55 is restricted by the stopper 66.

Next, there will be described the transmission gears 88 through 92 each as a transmission gear according to the present invention. The transmission gears 88 through 92 are provided along a revolution path of the planetary gears 62, 63 and rotatably supported by the frame 51. Each of the transmission gears 88 through 92 is meshed with an appropriate one of the planetary gears 62, 63 according to each of the rotation positions of the cam plate 55.

The transmission gear 88 is provided for transmitting the driving force to the spool 50. The transmission gear 88 disposed at a position shown in FIGS. 2 and 4 transmits the driving force, via a clutch spring (not shown), to a transmission gear 93 (shown in FIG. 3) provided therebehind, namely, provided between the transmission gear 88 and the frame 51 so as to be coaxial with the gear 88. Like the clutch spring 61, the clutch spring (not shown) transmits a rotation with an increased torque in one of the forward and reverse directions, and transits a rotation with a decreased torque in the other of the forward and reverse directions. As shown in FIG. 3, the transmission gear 93 is meshed with a transmission gear 94 provided to be opposite to the transmission gear 88 with respect to the frame 51. The transmission gear 94 is meshed with a transmission gear 95 provided adjacent thereto. It is noted that the transmission gears 94, 95 are rotatably supported by the frame 51. Although not shown in the drawings, the driving force is transmitted from the transmission gear 95 to the spool 50 by a transmitting mechanism including a series of gears, a belt or the like. Therefore, when the transmission gear 88 is rotated, the driving force is finally transmitted to the spool 50.

The transmission gear 95 is meshed with an interlock gear 96 provided adjacent thereto. The driving force is transmitted from the interlock gear 96 to a transmission gear 101 via a friction clutch 103 (shown in FIG. 2). As will be described more specifically later, the transmission gear 101 is provided for transmitting the driving force to the platen roller 46. The driving force is transmitted to the interlock gear 96 via the transmission gears 94, 95 when the transmission gear 88 is rotated. However, the transmission of the driving force from the interlock gear 96 to the transmission gear 101 is interrupted if the friction clutch 103 is slipped by a frictional resistance generated in the platen roller. Therefore, the driving force is not transmitted to the platen roller 46 through the transmission gear 88 is rotated.

The transmission gear 89 is provided for transmitting the driving force to the sheet-discharging roller 47. The transmission gear 89 disposed at a position shown in FIGS. 2 and 4 is a two-speed gear and transmits the driving force at a predetermined speed variation ratio. Although not shown in the drawings, the driving force is transmitted from the transmission gear 89 to the sheet-discharging roller 47 by a transmitting mechanism including a series of the gears, a belt or the like. Therefore, when the transmission gear 89 is rotated, the driving force is finally transmitted to the sheet-discharging roller 47.

The transmission gear 90 is provided for transmitting the driving force to the document-supplying roller 33 and the document-discharging roller 36. The transmission gear 90 disposed at a position shown in FIGS. 2 and 4 is a two-speed gear. As shown in FIG. 3, the transmission gear 90 is meshed with a reduction gear 97 which is provided to be opposite thereto with respect to the frame 51. The reduction gear 97 is meshed with a transmission gear 98 provided adjacent thereto. It is noted that the reduction gear 97 and the transmission gear 98 are rotatably supported by the frame 51. Although not shown in the drawings, the driving force is transmitted from the transmission gear 98 to the document-supplying roller 33 and the document-discharging roller 36 by a transmitting mechanism including a series of gears, a belt or the like. Therefore, when the transmission gear 90 is rotated, the driving force is finally transmitted to the document-supplying roller 33 and the document-discharging roller 36.

The transmission gear 91 is provided for transmitting the driving force to the sheet-supplying roller 43. The transmission gear 91 disposed at a position shown in FIG. 4 is meshed with a transmission gear 99 shown in FIG. 2. It is noted that the transmission gear 91 is not shown in FIG. 2 since the transmission gear 91 is disposed behind the transmission gear 101. The transmission gear 91 is meshed with a transmission gear 100 provided adjacent thereto. It is noted that the transmission gears 99, 100 are rotatably supported by the frame 51. Although not shown in the drawings, the driving force is transmitted from the transmission gear 100 to the sheet-supplying roller 43 by a transmitting mechanism including a series of gears, a belt or the like. Therefore, when the transmission gear 91 is rotated, the driving force is finally transmitted to the sheet-supplying roller 43.

The transmission gear 92 is provided for transmitting the driving force to the platen roller 46. The transmission gear 92 disposed at a position shown in FIGS. 2 and 4 is meshed with the transmission gear 101 shown in FIG. 2. The transmission gear 101 is meshed with a transmission gear 102 provided adjacent thereto. It is noted that the transmission gears 101, 102 are rotatably supported by the frame 51. Although not shown in the drawings, the driving force is transmitted from the transmission gear 102 to the platen roller 46 by a transmitting mechanism including a series of gears, a belt or the like. Therefore, when the transmission gear 92 is rotated, the driving force is finally transmitted to the platen roller 46.

As described above, the driving force is transmitted, via the friction clutch 103, from the transmission gear 101 to the interlock gear 96 disposed opposite thereto with respect to the frame 51. The transmission gear 101 is interposed between clutch plates of the friction clutch 103 that are biased by a spring, so that the driving force is transmitted from the friction clutch 103 to the transmission gear 101 with a predetermined rotation torque. In a case in which a load greater than the predetermined rotation torque occurs between the friction clutch 103 and the transmission gear 101, the clutch plates are slipped with respect to the transmission gear 101. Owing to this transmitting mechanism, a rotation of the platen roller 46 and a rotation of the spool 50 are synchronized with each other. That is, the spool 50 is rotated in synchronism with the a rotation of the platen roller 46, whereby the ink ribbon 49 which is rolled up by the spool 50 passes between the thermal head 45 and the platen roller 46. However, as the ink ribbon 49 is rolled up by the spool 50, a rolling-up speed of the spool 50 at which the ink ribbon 49 is rolled up is increased corresponding to a thickness of the ink ribbon that has been rolled up. If an excessive tension is produced in the ink ribbon 49 due to a difference between the rotation speed of the platen roller 49 and the rolling-up speed of the spool 50, the friction clutch 103 is slipped, so that the transmission of the driving force to the spool 50 is temporarily interrupted. That is, the friction clutch 103 transmits the driving force with an appropriate torque that does not break the ink ribbon 49.

Next, there will be described a switch 104 according to the present invention. The switch 104 is selectively placed in one of ON and OFF states on the basis of a swinging of a switch lever 105. The switch lever 105 is swing by each of the projecting portions 111 through 116 of the cam plate 55.

As shown in FIGS. 2 and 4, the switch 104 is disposed in a vicinity of the cam plate 55 and fixed to the frame 51. A structure for ring the switch 104 is not specifically limited. For example, a locking claw such as a snap fit may be formed in the frame 51, so that the switch 104 is locked thereby or engaged therewith at a predetermined position of the frame 51. Two lead wires 106, 107 are drawn out of the switch 104. In FIGS. 2, 4, etc., only respective parts of the lead wires 106, 107 are shown. The lead wires 106, 107 are connected to a control board of the facsimile apparatus 1. Therefore, information representing the ON/OFF state of the switch 104 is inputted to the control board via the lead wires 106, 107. It is noted that the control board is not shown in the drawings.

On a body 108 of the switch 104, there is provided the switch lever 105 which is swingable within a predetermined angular range. As shown in FIG. 4, the switch lever 105 projects toward the cam plate 55. As shown in FIG. 8, the switch lever 105 is kept still when an external force is not applied thereto. In this state, the switch lever 105 can contact each of the projecting portions 111 through 116, and can not contact each of the non-projecting portions 117 through 122. Further, in this state, the switch 104 is in the OFF state. The switch lever 105 swings clockwise by contacting with each of the projecting portions 111 through 116 of the cam plate 55 which is forwardly rotated (i.e., rotated counterclockwise in FIG. 8). Owing to this movement, the switch 104 is brought into the ON state. The switch lever 105 is counterclockwise biased by a spring, so that the clockwise swinging of the lever 105 is resisted. Therefore, when each of the projecting portions 111-116 is moved away from the switch lever 105, the switch lever 105 is moved back to a predetermined position (i.e., a rest position) shown in FIG. 8. It is noted that, although not shown, a counterclockwise swinging of the switch lever 105 from the rest position shown in FIG. 8 is restricted by a stopper or the like.

The projecting portions 111 through 116 formed on the outer periphery of the cam plate 65 respectively correspond to the non-projecting portions 117 through 122. That is, the six projecting portions 111 through 116 are alternate with the six non-projecting portions 117 through 122.

Within an angular range from the projecting portion 111 to the projecting portion 116, the projecting portions 111 through 116 are spaced from each other at a regular angular pitch. This angular pitch corresponds to a regular angular pitch at which the six holes 81 through 86 are provided in the frame 51. That is, when the switch lever 105 is positioned at a specific position between each pair of adjacent projecting portions of the six projecting portions 111 through 116, namely, when the switch lever 105 is positioned at a specific position in each of the six non-projection portions 117 through 122, the swinging piece 69 of the stopper 66 enters a corresponding one of the six holes 81 through 86.

Next, there will be described a saving mechanism according to the present invention. The saving mechanism is provided for saving the switch lever 105 from being forcedly swung counterclockwise from the rest position thereof (shown in FIG. 8), by the contact of the switch lever 105 with each of the projecting portions 111 through 116 being reversely rotated. The saving mechanism may be provided on either one of the cam plate 55 and the switch lever 105. In the present embodiment, the saving mechanism is provided on the cam plate 55.

Figure 9:
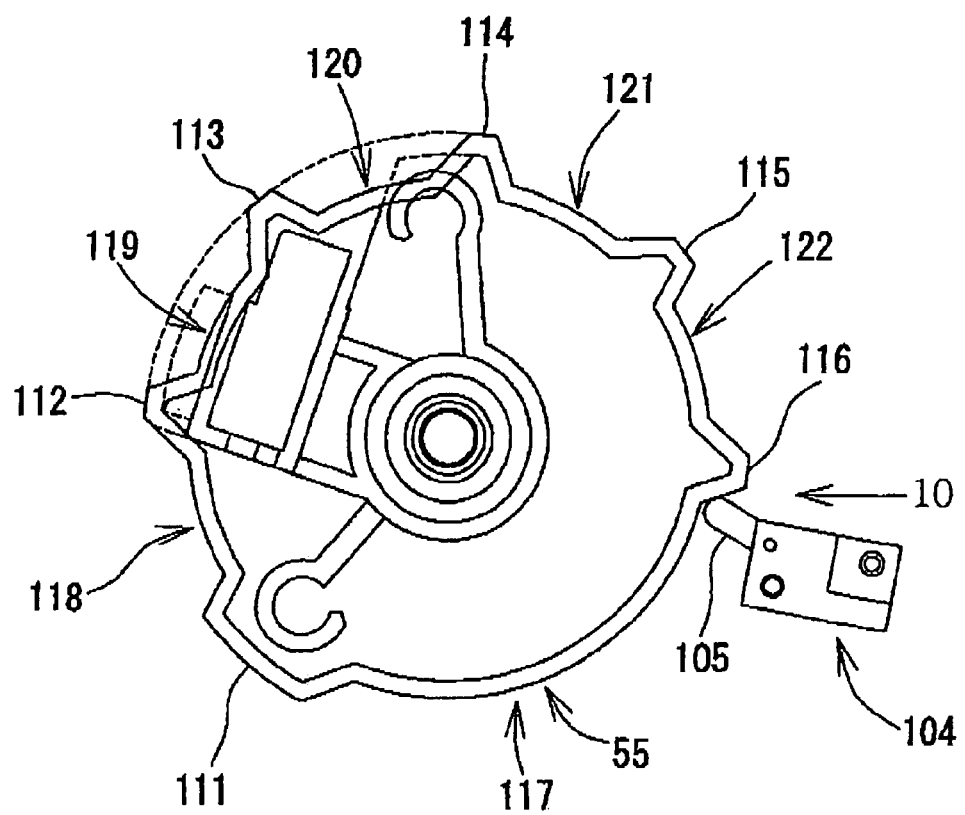
FIG. 9 is a plan view showing a state in which a projecting portion of the cam plate which is reversely rotated nearly contacts a switch lever.
Figure 10:
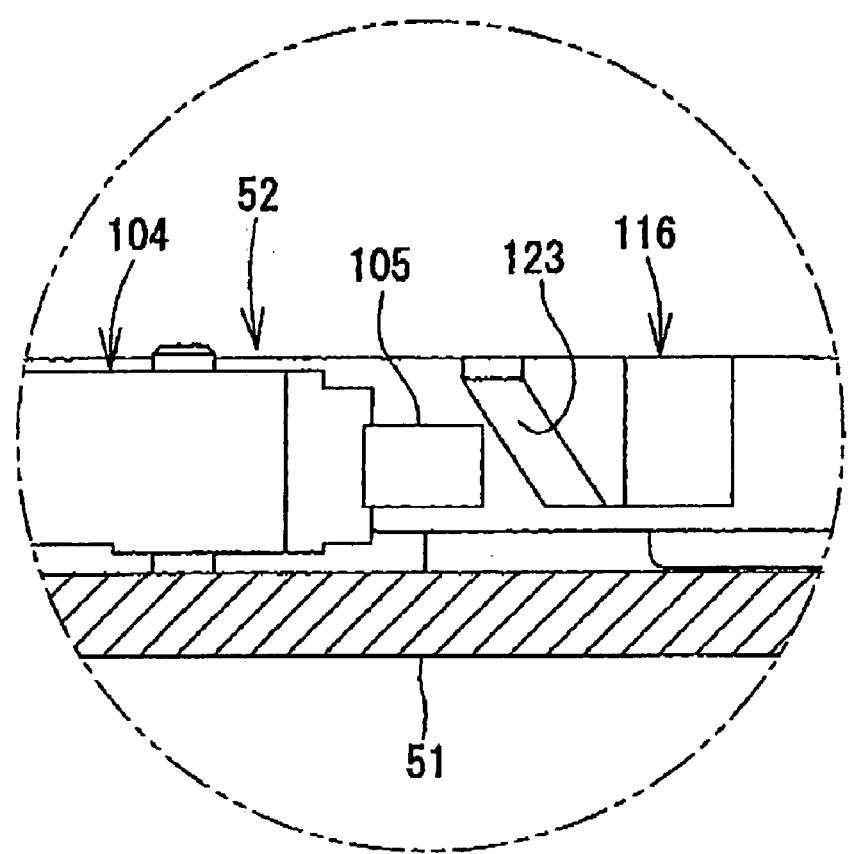
FIG. 10 is an enlarged partial view as seen in a direction indicated an arrow 10 shown in FIG. 9.

FIG. 9 is a plan view showing a state in which the projecting portion 116 of the cam plate 55 which is reversely rotated nearly contacts the switch lever 105. FIG. 10 is an enlarged partial view as seen in a direction indicated by an arrow 10 shown in FIG. 9. The projecting portion 116 has, in an end portion thereof the switch lever 105 contacts when the projecting portion 116 is reversely rotated, a guide surface 123 is inclined toward the frame 51 with respect to the axial direction of the cam plate 55.

Figure 11:
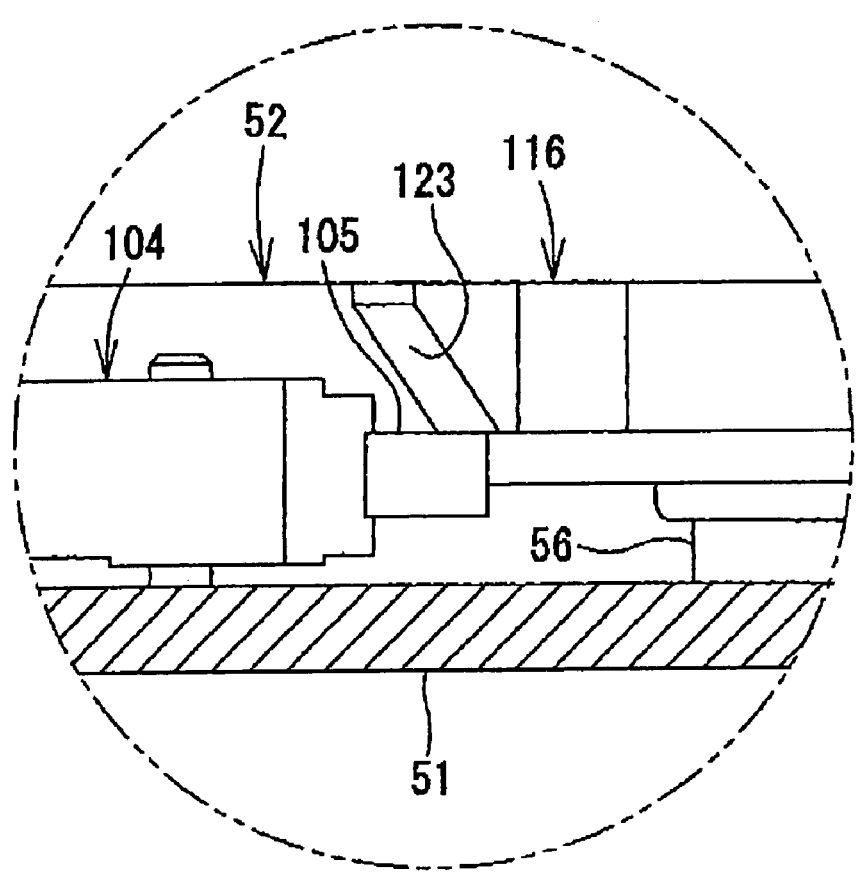
FIG. 11 is an enlarged partial view showing a state in which the cam plate is retracted in a direction along a support shaft of a frame.

When the cam plate 55 is further reversely rotated in the state shown in FIGS. 9 and 10 (i.e., rotated clockwise in FIG. 9), the guide surface 123 of the projecting portion 116 contacts the switch lever 105. Since the guide surface 123 is inclined toward the frame 51 with respect to the axial direction of the cam plate 55, one of the switch lever 105 and the projecting portion 116 of the cam plate 115 is guided relatively by the other of the switch lever 105 and the projecting portion 116 of the cam plate 115 in a direction in which the switch lever 105 is retracted (i.e., in a retracting direction). In the present embodiment, as shown in FIG. 5, the cam plate 55 and the sun gear 52 are provided on the frame 51 so as to be slightly movable with respect to the support shaft 56 of the frame 51 in an axial direction in which the support shaft 56 extends. Therefore, the cam plate 55 is movable in a direction away from the frame 51, i.e., in the retracting direction, while being slid relative to the support shaft 56. As shown in FIG. 11, when the cam plate 55 is moved in the retracting direction, the switch lever 105 is relatively guided to a position between the projecting portion 116 and the frame 51. When the cam plate 55 is further reversely rotated, the projecting portion 116 passes over the switch lever 105.

Although not described or shown, each of the other projecting portions 111 through 115 has a guide surface similar to the above-described guide face 123. Therefore, if the switch lever 105 contacts each of the other projecting portions 111 through 115 when the cam plate 55 is reversely rotated, the switch lever 105 is guided relatively by the each projecting portion 111 through 115 in the retracting direction, owing to the guide surface thereof.

Hereinafter, there will be described a mode changing operation conducted by the transmission 10 in the facsimile apparatus 1. In the transmission 10, one or both of the planetary gears 62, 63 is or are meshed with one or two of the transmission gears 88 through 92 by the rotation of the cam plate 55, whereby the driving force is selectively transmitted to one or two of the document-supplying roller 33, the document-discharging roller 36, the sheet-supplying roller 43, the platen roller 46, the sheet-discharging roller 47 and the spool 50.

As shown in FIG. 5, the sun gear 52 is forwardly or reversely rotated according to the forward or reverse rotation of the pulse motor 53. The forward or reverse rotation of the sun gear 52 is transmitted to the cam plate 55 via the clutch spring 61. When the cam plate 55 is forwardly or reversely rotated, the planetary gears 62, 63 revolve about the rotation axis of the sun gear 52. Owing to the revolution, one or both of the planetary gears 62, 63 is or are meshed with or separated from one or two of the transmission gears 88 through 92. If a load larger than a predetermined torque is applied to the cam plate 55 when the clutch spring 61 transmits the reverse rotation of the sun gear 52 to the cam plate 55, the clutch sprig 61 is slipped without transmitting the rotation of the sun gear 52 to the cam plate 55. That is, the sun gear 52 is reversely rotated and the rotation thereof is transmitted to the planetary gears 62, 63, but the cam plate 55 is stopped.

The load to stop the cam plate 55 is applied to the stopper 66. As shown in FIG. 6, the reverse rotation of the cam plate 55 is stopped when the swinging piece 69 of the stopper 66 is engaged with any one of the holes 81 through 86 of the frame 51. A rotation position at which the cam plate 55 is stopped depends on which one of the holes 81 through 86 the swinging piece 69 of the stopper 66 is engaged with. This rotation position is a first rotation position at which the reverse rotation of the cam plate 55 is inhibited.

FIGS. 12 through 17 are plan views showing the respective rotation positions of the cam plate 55 when the swinging piece 69 of the stopper 66 is engaged with the respective holes 81 through 86 of the frame 51. It is noted that the holes 81 through 86 are not shown in FIGS. 12 through 17 since the holes 81 through 86 are located behind the cam plate 55. Further, the sun gear 52 is omitted from FIGS. 12 through 17.

Figure 12:
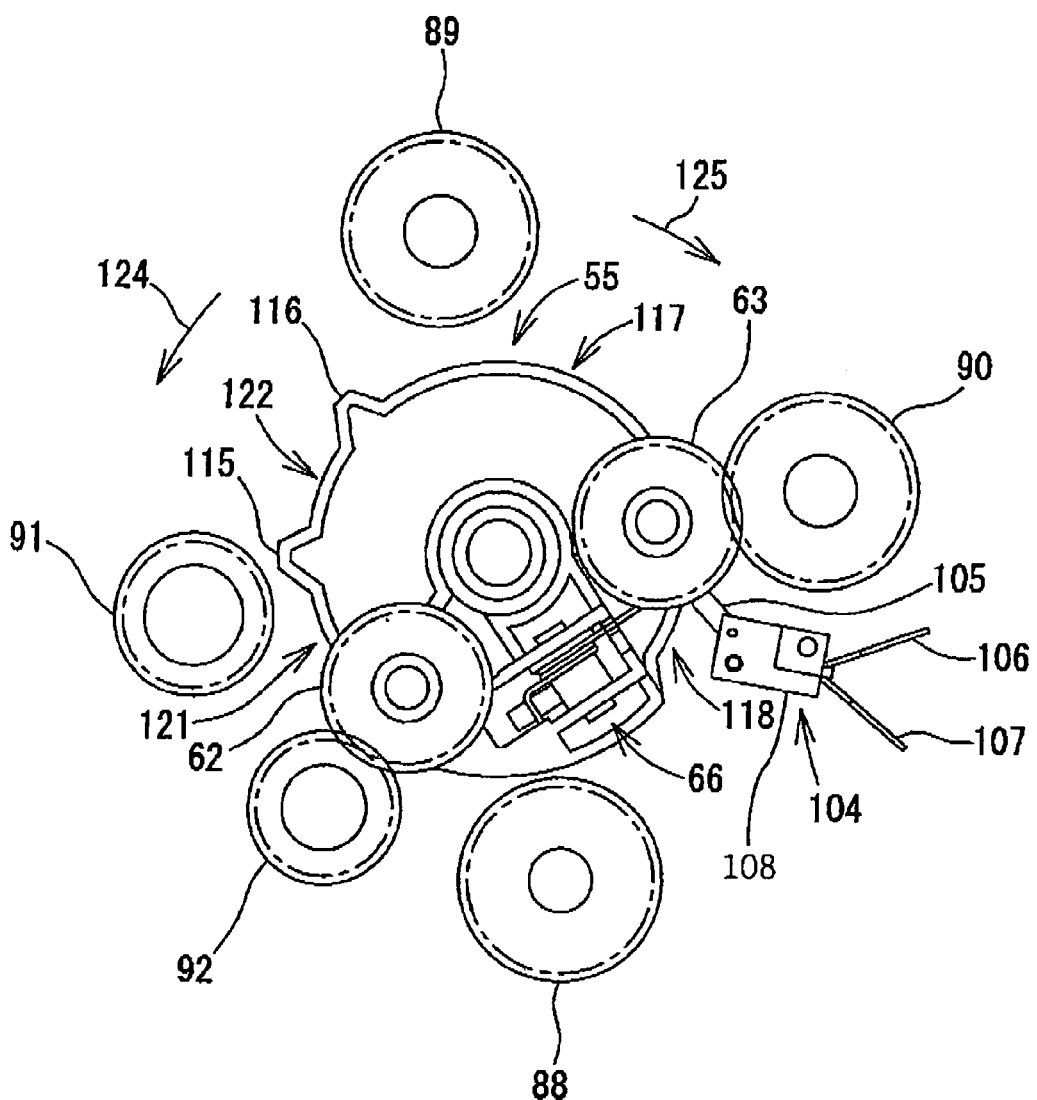
FIG. 12 is a plan view showing a rotation position of the cam plate where the swinging piece of the stopper enters a first hole of the frame.

FIG. 12 shows a rotation position at which the swinging piece 69 of the stopper 66 is engaged with the hole 81 (i.e., a first hole) of the frame 51. When the cam plate 55 is stopped at this rotation position, the planetary gear 62 is meshed with the transmission gear 92. Further, the planetary gear 63 is meshed with the transmission gear 90. The switch lever 105 of the switch 104 is opposed to the non-projecting portion 118. The cam plate 55 is inhibited, by the stopper 66, from being rotated in the reverse direction indicated by an arrow 125. On the other hand, the cam plate 55 is rotatable in the forward direction indicated by an arrow 124. Therefore, the clutch spring 61 is slipped when the sun gear 52 is rotated in the reverse direction indicated by the arrow 125, so that the cam plate 55 is stopped at the rotation position shown in FIG. 12. The reverse rotation of the sun gear 52 is transmitted to each of the planetary gears 62, 63 via the second gear portion 60. The rotation of the planetary gear 62 is finally transmitted to the platen roller 46 and the spool 50 via the transmission gear 92. The rotation of the planetary gear 63 is finally transmitted to the document-supplying roller 33 and the document-discharging roller 36 via the transmission gear 90. That is, when the cam plate 55 is stopped at the rotation position shown in FIG. 12, an image of a document is read by the image reading section 3 and the image is recorded on a recording sheet by the image recording section 4. The above-described mode is selected in the copying operation by the facsimile apparatus 1. In the present embodiment, this mode is called as the "copying mode".

Figure 13:
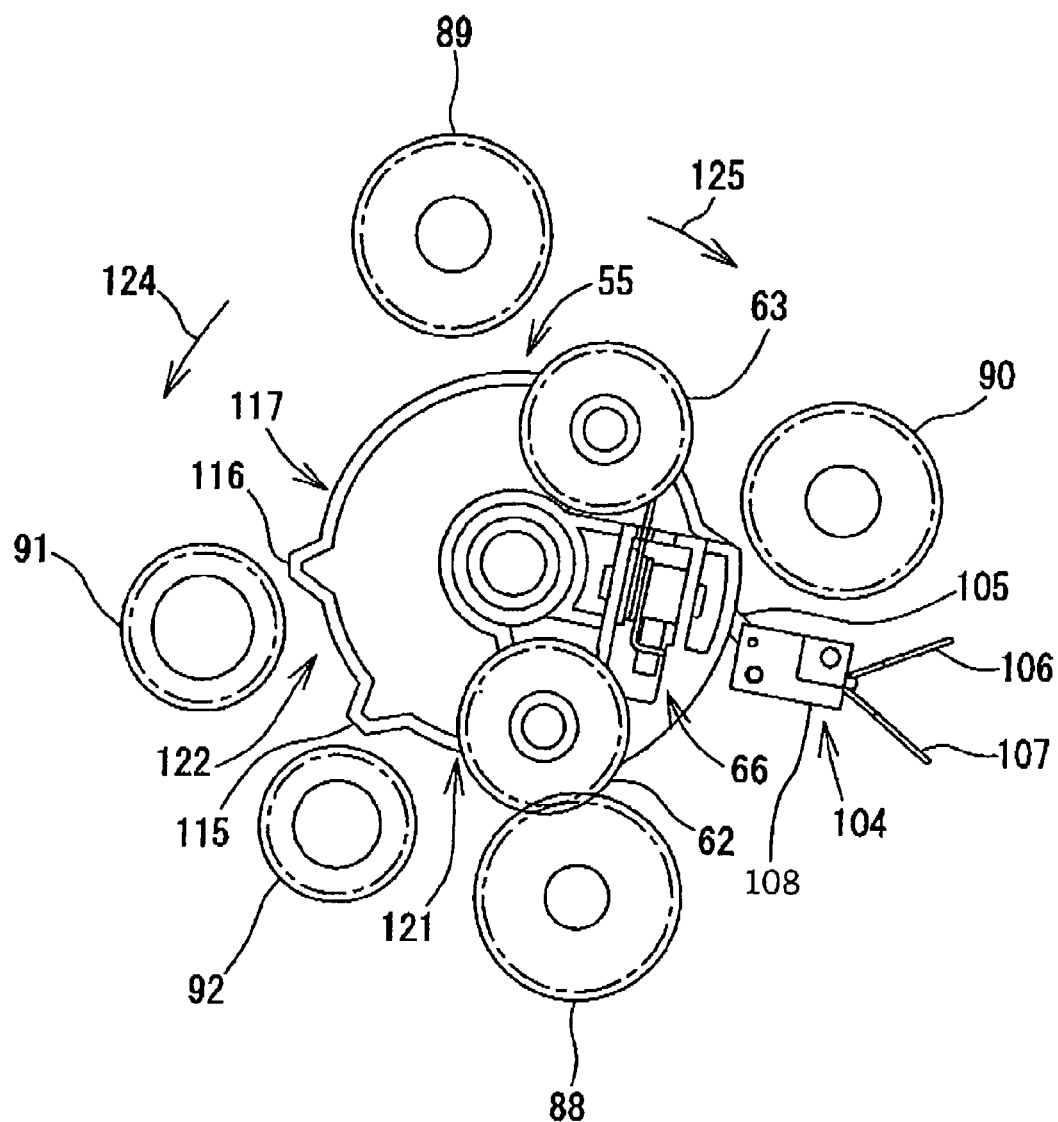
FIG. 13 is a plan view showing a rotation position of the cam plate where the swinging piece enters a second hole of the frame.

FIG. 13 shows a rotation position at which the swinging piece 69 of the stopper 66 is engaged with the hole 82 (i.e., a second hole) of the frame 51. When the cam plate 55 is stopped at this rotation position, the planetary gear 62 is meshed with the transmission gear 88, but the planetary gear 63 is not meshed with any of the transmission gears 88 through 92. The switch lever 105 of the switch 104 is opposed to the non-projecting portion 119. However, the non-projecting portion 119 is not shown in FIG. 13 (but is shown in FIG. 8). The cam plate 55 is inhibited, by the stopper 66, from being rotated in the reverse direction indicated by the arrow 125. On the other hand, the cam plate 55 is rotatable in the forward direction indicated by the arrow 124. Therefore, the clutch spring 61 is slipped when the sun gear 52 is reversely rotated in the reverse direction indicated by the arrow 125, so that the cam plate 55 is stopped at a rotation position shown in FIG. 13. The reverse rotation of the sun gear 52 is transmitted to each of the planetary gears 62, 63 via the second gear portion 60. The rotation of the planetary gear 62 is finally transmitted to the platen roller 46 and the spool 50 via the transmission gear 88. The rotation of the planetary gear 63 is not transmitted. That is, when the cam plate 55 is stopped at the rotation position shown in FIG. 13, the ink ribbon 49 is rolled up by the spool 50. The above-described mode is selected when the ink ribbon 49 is supplied to the facsimile apparatus 1. In the present embodiment, this mode is called as the "ink-ribbon rolling-up mode".

Figure 14:
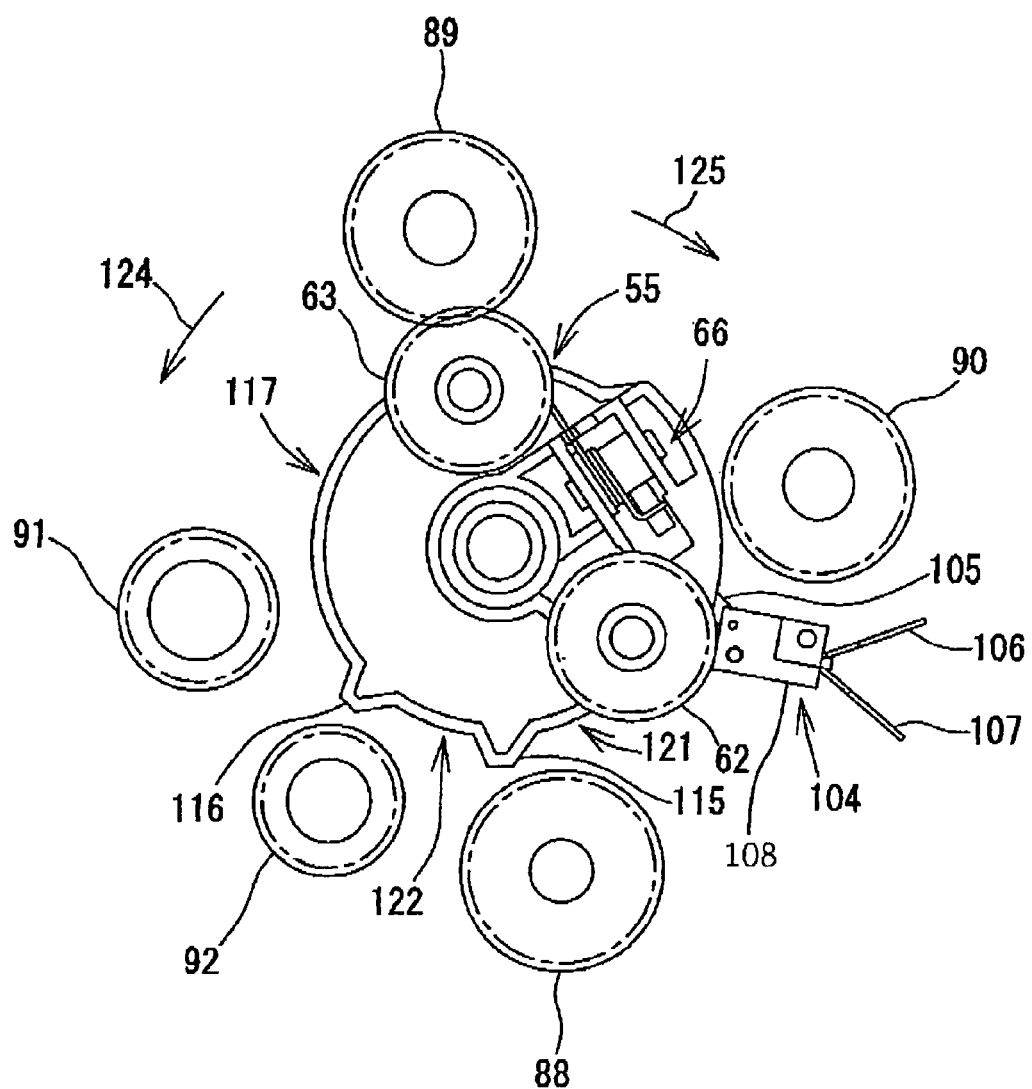
FIG. 14 is a plan view showing a rotation position of the cam plate where the swinging piece enters a third hole of the frame.

FIG. 14 shows a rotation position at which the swinging piece 69 of the stopper 66 is engaged with the hole 83 (i.e., a third hole) of the frame 51. When the cam plate 55 is stopped at this rotation position, the planetary gear 62 is not meshed with any of the transmission gears 88 through 92. However, the planetary gear 63 is meshed with the transmission gear 89. The switch lever 105 of the switch 104 is opposed to the non-projecting portion 120. However, the non-project portion 120 is not shown in FIG. 14 (but is shown in FIG. 8). The cam plate 55 is inhibited, by the stopper 66, from being rotated in the reverse direction indicated by the arrow 125. On the other hand, the cam plate 65 is rotatable in the forward direction indicated by the arrow 124. Therefore, the clutch spring 61 is slipped when the sun gear 52 is rotated in the reverse direction indicated by the arrow 125, so that the cam plate 55 is stopped at the rotation position shown in FIG. 14. The reverse rotation of the sun gear 52 is transmitted to each of the planetary gears 62, 63 via the second gear portion 60. The rotation of the planetary gear 62 is not transmitted. The rotation of the planetary gear 63 is finally transmitted to the sheet-discharging roller 47 via the transmission gear 89. That is, when the cam plate 55 is stopped at the rotation position shown in FIG. 14, the recording sheet is discharged by the sheet-discharging roller 47. The above-described mode is selected after an image has been recorded on a recording sheet in the facsimile receiving or copying operation in the facsimile apparatus 1. In the present embodiment, this mode is called as the sheet-discharging mode.

Figure 15:
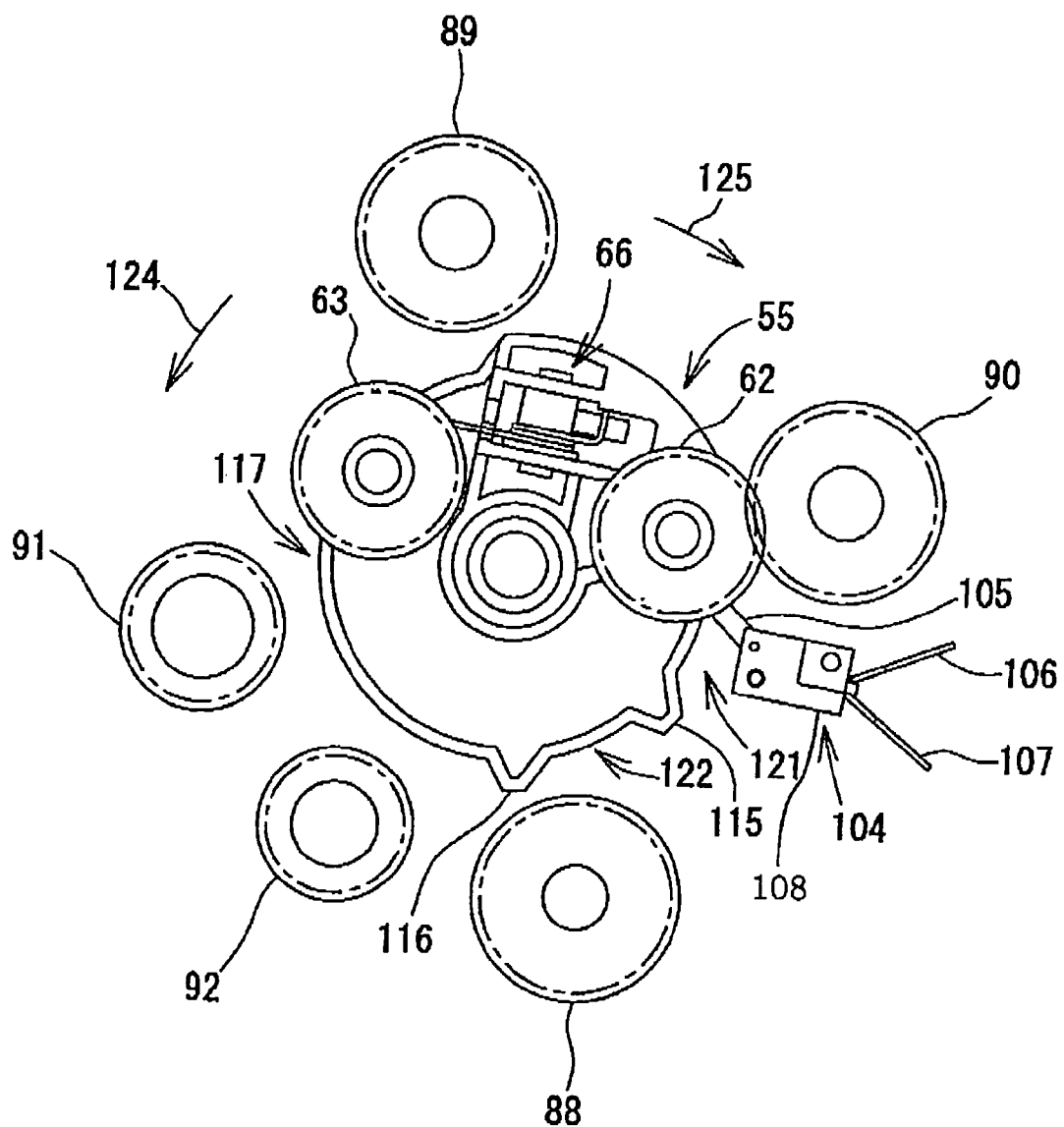
FIG. 15 is a plan view showing a rotation position of the cam plate where the swinging piece enters a fourth hole of the frame.

FIG. 15 shows a rotation position at which the swinging piece 69 of the stopper 66 is engaged with the hole 84 (i.e., a forth hole) of the frame 51. When the cam plate 55 is stopped at this rotation position, the planetary gear 62 is meshed with the transmission gear 90. However, the planetary gear 63 is not meshed with any of the transmission gears 88 through 92. The switch lever 105 of the switch 104 is opposed to the non-projecting portion 121. The cam plate 55 is inhibited, by the stopper 66, from being rotated in the reverse direction indicated by the arrow 125. On the other hand, the cam plate 55 is rotatable in the forward direction indicated by the arrow 124. Therefore, the clutch spring 61 is slipped when the sun gear 52 is rotated in the reverse direction indicated by the arrow 125, so that the cam plate 55 is stopped at the rotation position shown in FIG. 15. The reverse rotation of the sun gear 52 is transmitted to each of the planetary gears 62, 63 via the second gear portion 60. The rotation of the planetary gear 62 is finally transmitted to the document-supplying roller 33 and the document-discharging roller 36 via the transmission gear 90. The rotation of the planetary gear 63 is not transmitted. That is, when the cam plate 65 is stopped at the rotation position shown in FIG. 15, a document is carried by the document-supply roller 33 and the document-discharging roller 36. The above-described mode is selected when an image of the document is read in the facsimile sending operation in the facsimile apparatus 1. In the present embodiment, this mode is called as the "document-reading mode".

Figure 16:
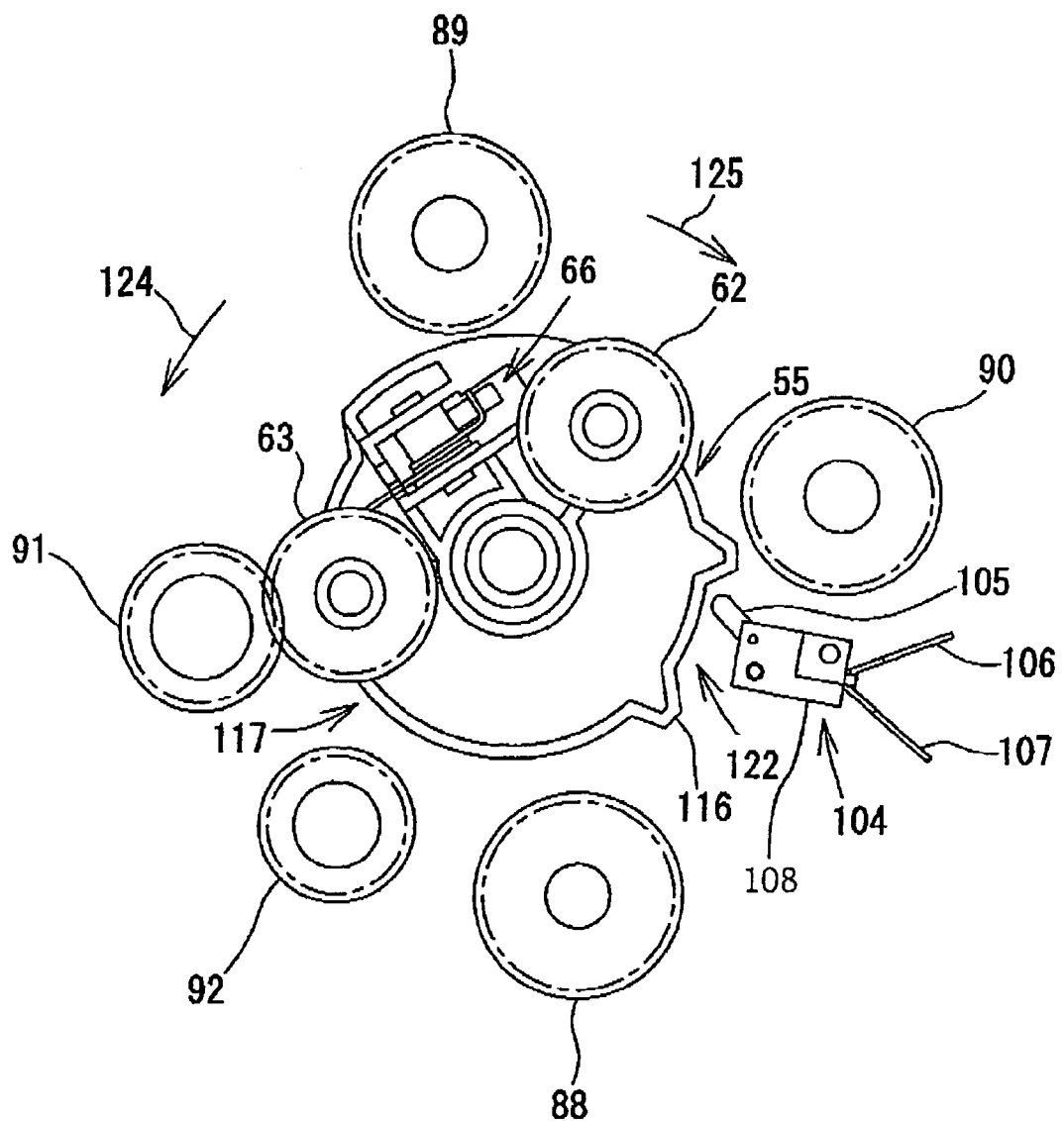
FIG. 16 is a plan view showing a rotation position of the cam plate where the swinging piece enters a fifth hole of the frame.

FIG. 16 shows a rotation position at which the swinging piece 69 of the stopper 66 is engaged with the hole 85 (i.e., a fifth hole) of the frame 51. When the cam plate 55 is stopped at this rotation position, the planetary gear 62 is not meshed with any of the transmission gears 88 through 92. However, the planetary gear 63 is meshed with the transmission gear 91. The switch lever 105 of the switch 104 is opposed to the non-projecting portion 122. The cam plate 55 is inhibited, by the stopper 66, from being rotated in the reverse direction indicated by the arrow 125. On the other hand, the cam plate 55 is rotatable in the forward direction indicated by the arrow 124. Therefore, the clutch spring 61 is slipped when the sun gear 52 is rotated in the reverse direction indicated by the arrow 125, so that the cam plate 55 is stopped at the rotation position shown in FIG. 16. The reverse rotation of the sun gear 52 is transmitted to each of the planetary gears 62, 63 via the second gear portion 60. The rotation of the planetary gear 62 is not transmitted. The rotation of the planetary gear 63 is finally transmitted to the sheet-supplying roller 43 via the transmission gear 91. That is, when the cam plate 55 is stopped at the rotation position shown in FIG. 16, a recording sheet is carried by the sheet-supplying roller 43' from the sheet tray 40. The above-described mode is selected when an image is recorded on the recording sheet in the facsimile receiving or copying operation in the facsimile apparatus 1. In the present embodiment, this mode is called as the "sheet-supplying mode".

Figure 17:
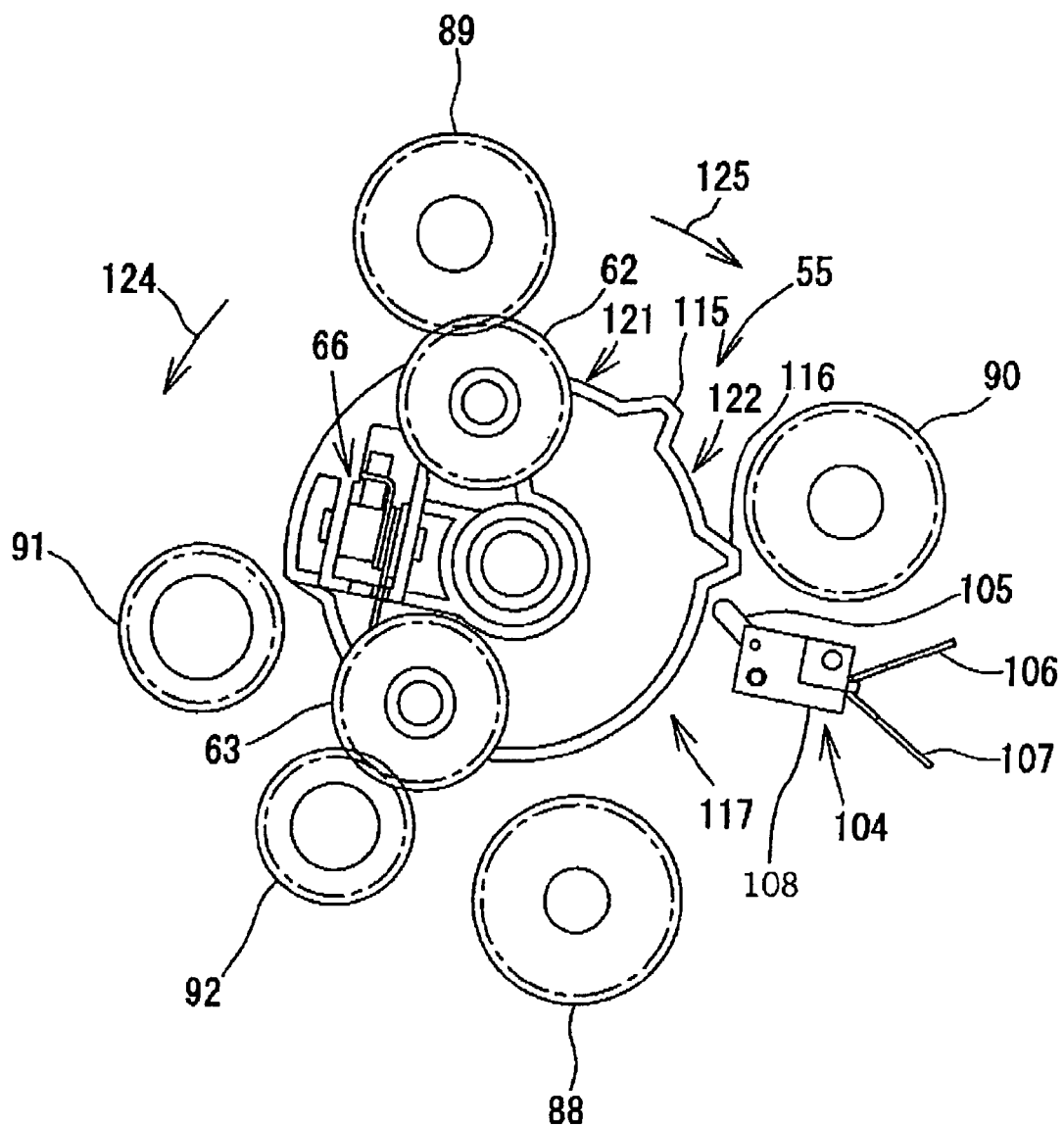
FIG. 17 is a plan view showing a rotation position of the cam plate where the swinging piece enters a sixth hole of the frame.

FIG. 17 shows a rotation position at which the swinging piece 69 of the stopper 66 is engaged with the hole 86 (i.e., a sixth hole) of the frame 51. When the cam plate 55 is stopped at this rotation position, the planetary gear 62 is meshed with the transmission gear 89. Further, the planetary gear 63 is meshed with the transmission gear 92. The switch lever 105 of the switch 104 is opposed to the non-projecting portion 117. The cam plate 55 is inhibited, by the stopper 66, from being rotated in the reverse direction indicated by the arrow 125. On the other hand, the cam plate 55 is rotatable in the forward direction indicated by the arrow 124. Therefore, the clutch spring 61 is slipped when the sun gear 52 is rotated in the reverse direction indicated by the arrow 125, so that the cam plate 55 is stopped at the rotation position shown in FIG. 17. The reverse rotation of the sun gear 52 is transmitted to each of the planetary gears 62, 63 via the second gear portion 60. The rotation of the planetary gear 62 is finally transmitted to the sheet-discharging roller 47 via the transmission gear 89. The rotation of the planetary gear 63 is finally transmitted to the platen roller 46 and the spool 50 via the transmission gear 92. That is, when the cam plate 55 is stopped at the rotation position shown in FIG. 17, an image is recorded on a recording sheet by the image recording section 4. The above-described mode is selected when the image is recorded on the recording sheet in the facsimile receiving operation in the facsimile apparatus 1. In the present embodiment, this mode is called as the "recording mode".

As shown in FIGS. 12 through 17, the rotation position at which the cam plate 55 is inhibited from being rotated in the reverse direction depends on which one of the holes 81 through 86 the swinging piece 69 of the stopper 66 is engaged with. Also, which one or two of the transmission gears 88 through 92 one or both of the planetary gears 62, 63 is or are meshed with depends on the rotation position of the cam plate 55. Thus, the facsimile apparatus 1 controls the transmission of the driving force such that the driving force is selectively transmitted from the pulse motor 53 to one or two of the driving portions, i.e., the document-supplying roller 33, the document-discharging roller 36, the sheet-supplying roller 43, the platen roller 46, the sheet discharging roller 47 and the spool 50.

As shown in FIG. 8, the cam plate 55 includes, on its outer periphery, the projecting portions 111 through 116 and the non-projecting portions 117-122. The stopper 66 only inhibits the reverse rotation of the cam plate 55, while always permitting the cam plate 56 to be forwardly rotated. Therefore, the cam plate 55 can be positioned, by its forward rotation, at a desired one of the rotation positions shown in FIG. 12 through FIG. 17. The forward rotation of the cam plate 55 is caused by the forward rotation of the pulse motor 53 which is transmitted to the cam plate 55 via the sun gear 52. Owing to the forward rotation of the cam plate 55, the projecting portions 111 through 116 forwardly revolve and sequentially contact the switch lever 105, thereby causing the switch lever 105 to swing. Upon the swinging of the switch lever 105 in the clockwise direction, the switch 104 is brought into the ON state. Based on the ON state of the switch 104, a control section of the facsimile apparatus 1 judges that one of the projecting portions 111 through 116 of the cam plate 55 is positioned at a position where the switch 104 is provided.

Each of the projecting portions 111-116 is removed from the switch lever 105 when the cam plate 55 is further forwardly rotated, so that the switch lever 105 is swung back to the OFF state shown in FIG. 8. On the basis of the fact that the state of the switch 104 changes from the ON state to the OFF state, the control section judges that the above-indicated one of the projecting portions 111 through 116 has passed the position where the switch 104 is provided. It is noted that, although not specifically described, the control section of the facsimile apparatus 1 is a common controller which is constituted by a CPU, a ROM, a RAM and a driver that drives the pulse motor 53.

As shown in FIG. 8, the non-projecting portions 118 through 122, provided between the projecting portion 111 and the projecting portion 116 as seen in the clockwise direction, each have a same length in a circumferential direction of the cam plate 55. On the contrary, only the non-projecting portion 117 has a length larger than the length of each of the non-projecting portions 118 through 122. Therefore, in a case in which the cam plate 55 is forwardly rotated at a constant rotation speed, an interval between a time when the switch 104 is brought into the ON state by contacting the projecting portion 116 and a time when the switch 104 is brought into the ON state again by contacting the projecting portion 111 is longer than an interval needed for the switch 104 to be brought into the ON state, twice in a row, by sequentially contacting two adjacent ones of the projecting portions 111 through 115. In other words, in the area provided between the two projecting portions 116, 111, the switch 104 is not brought into the ON state again even if the pulse motor 53 is rotated by an amount corresponding to a predetermined number of pulses after the switch 104 has been brought into the ON state by contacting the projecting portion 116. This number is predetermined such that the switch 104 is brought into the ON state again in the area provided between two adjacent ones of the projecting portions 111 through 115.

Therefore, when the switch 104 is not brought into the ON state again even if the pulse motor 53 is rotated by the amount corresponding to the predetermined number of pulses after the switch 104 has been brought into the ON state, the control section of the facsimile apparatus 1 judges that the non-projecting portion 117 of the cam plate 55 is positioned at the position where the switch 104 is provided. Then, based on a number of times by which the switch 104 is brought into the ON state, the control section judges which one of the non-projecting portions 118 through 122 is currently positioned at the position of the switch 104. In the above-described manner, the control section judges the rotation position of the cam plate 55, and reversely rotates the cam plate 55 after forwardly rotating the same 55 to a predetermined rotation position. As a result, the swinging piece 69 of the stopper 66 enters the nearest one of the holes 81 through 86, so that the cam plate 55 is stopped at a corresponding one of the rotation positions shown in FIGS. 12 through 17 and one or both of the planetary gears 62, 63 is or are meshed with one or two of the transmission gears 88 through 92 that corresponds or corresponds to the rotation position of the cam plate 55.

Next, there will be described a timing to change the rotation of the cam plate 56 from the forward rotation to the reverse rotation. Hereinafter, as an example, there will be described a timing when the cam plate 55 is reversely rotated after forwardly rotated to the rotation position at which the switch lever 105 is opposed to the non-projecting portion 117.

Figure 18:
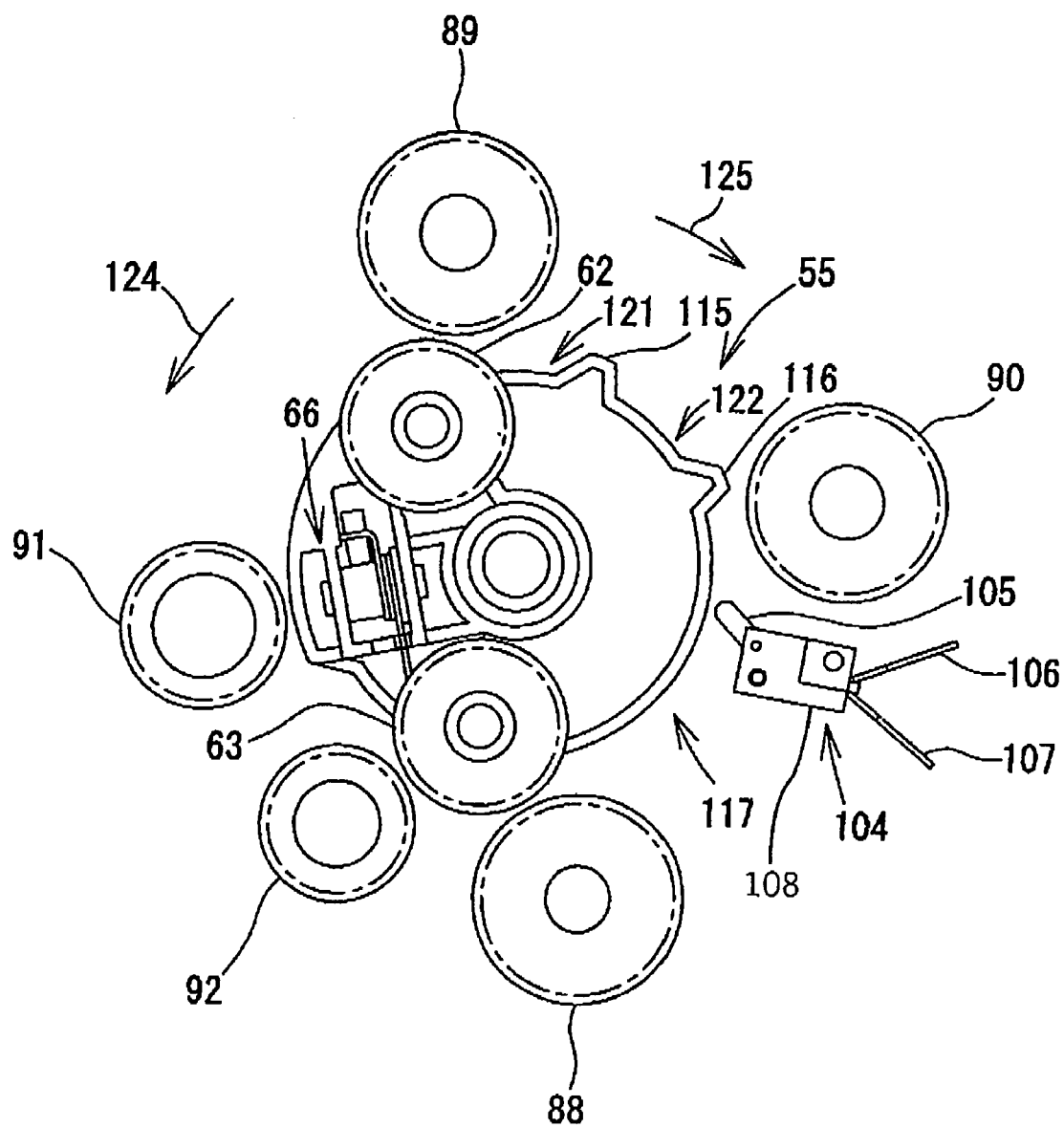
FIG. 18 is a plan view showing a rotation position of the cam plate where a rotation thereof is switched from a forward rotation to a reverse rotation.

If the switch 104 is brought into the ON state six times in a row after the control section of the facsimile apparatus 1 judges that the switch lever 105 is opposed to the non-projecting portion 117, the control section judges that the switch lever 105 is opposed to the non-projecting portion 117. The cam plate 55 is further forwardly rotated, passes the rotation position shown in FIG. 17, and is rotated to a rotation position shown in FIG. 18. The swinging piece 69 of the stopper 66 does not completely enter the hole 86 when the cam plate 55 is rotated in the forward direction. When the cam plate 55 is forwardly rotated to the rotation position shown in FIG. 18, the swinging piece 69 of the stopper 66 passes the hole 86 and contacts a surface of the frame 51, as shown in FIG. 7. The rotation position shown in FIG. 18 is determined by driving the pulse motor 53 by the amount corresponding to the predetermined number of pulses after the switch 104 has been brought into the ON state six times in a row. This number is predetermined such that the switch 104 is not brought into the ON state again after having been brought into the ON state in the area provided between two adjacent ones of the projecting portions 111 through 115.

At the rotation position shown in FIG. 18, the swinging piece 69 of the stopper 66 does not enter the hole 86 (shown in FIG. 7). Therefore, the reverse rotation of the cam plate 55 is not inhibited. When the cam plate 55 is reversely rotated to the rotation position shown in FIG. 17, the swinging piece 69 enters the hole 86 in the reverse direction of the cam plate 55 (shown in FIG. 6). Accordingly, the reverse rotation of the cam plate 55 is inhibited by the stopper 66 at the rotation position shown in FIG. 17. Since a predetermined load is applied, by the stopper 66, with respect to the reverse rotation of the cam plate 55, the clutch spring 61 is slipped, so that the sun gear 52 is reversely rotated in the state in which the cam plate 55 is stopped. Therefore, the planetary gears 62, 63 rotated by the reverse rotation of the sun gear 52 respectively transmit the driving force to the transmission gears 89, 92, so that the facsimile apparatus 1 is operated in the recording mode. According to the above-described arrangement, the switch 104 is configured to detect a rotation position of the cam plate 55 based on which the rotation of the cam plate 55 is changed from the forward rotation to the reverse rotation, namely, to detect a second rotation position of the cam plate 55.

Although there will not be given any descriptions about operations conducted in other cases in which the switch lever 105 is opposed to each one of the other non-projecting portions 118 through 122, these operations are conducted in a manner similar to the manner in which the above-described operation is conducted in the case of the non-projecting portion 117. In the thus described manner, the transmission 10 changes the driving-force transmitting modes according to the modes of the facsimile apparatus 1, e.g., the copying mode, the ink-ribbon rolling-up mode, the sheet-discharging mode, the document-reading mode, the sheet-supplying mode and the recording mode.

It may be assumed that the reverse rotation of the cam plate 65 is not restricted by the stopper 66, whereby any one of the projecting portions 111 through 116 contacts the switch lever 105. For instance, when the cam plate 55 is forwardly rotated from the rotation position shown in FIG. 16, the cam plate 55 is supposed to be forwardly rotated to the rotation position shown in FIG. 18, after the switch lever 105 has been swung by the projecting portion 116. However, it may be assumed that the control section changes the rotation of the cam plate 55 without driving the pulse motor 53 by the amount corresponding to the predetermined number of pulses immediately after the switch lever 105 has been swung by the projecting portion 116, due to an influence of electrical noise or the like.

Figure 19:
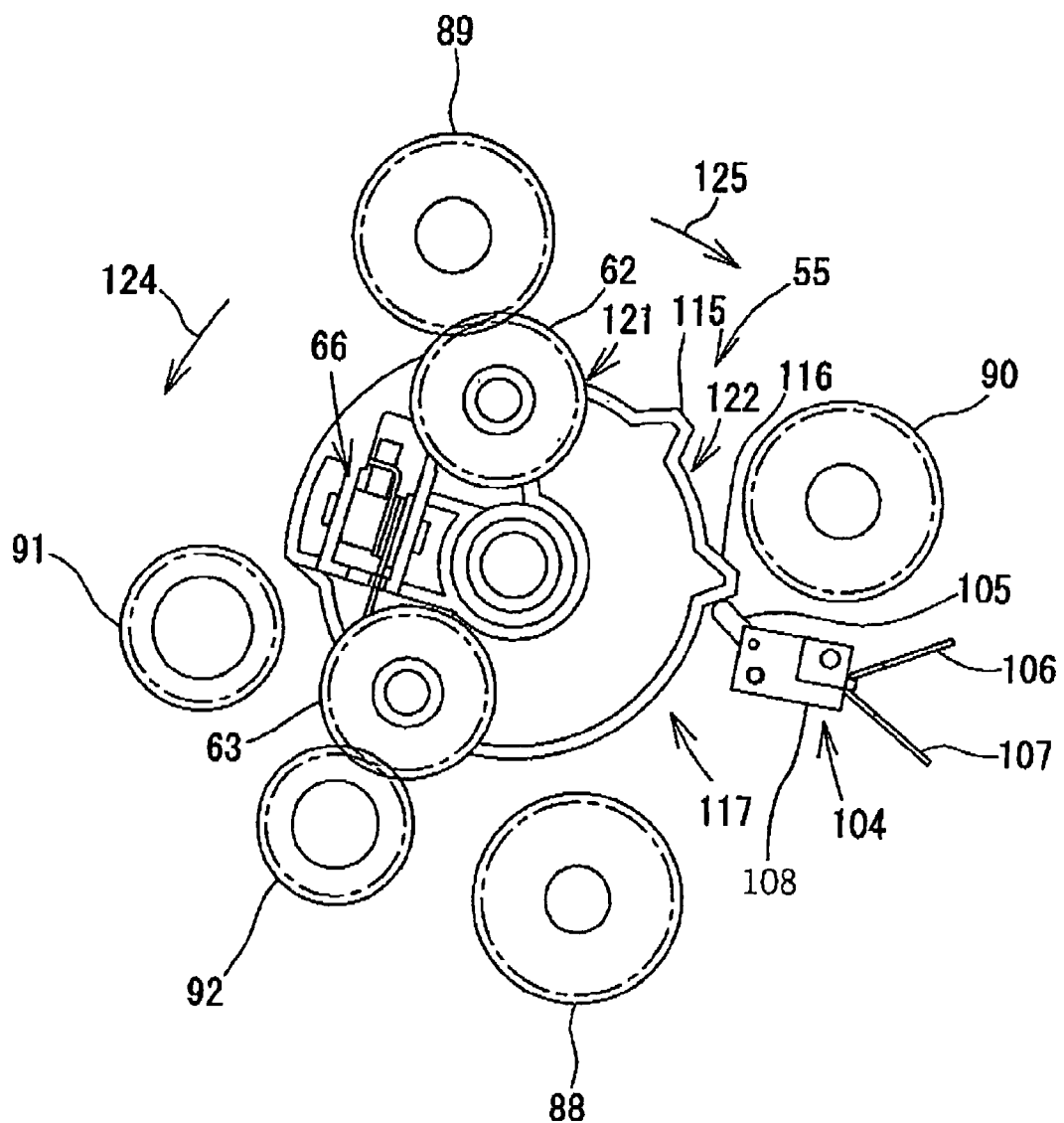
FIG. 19 is a plan view showing a state in which the switch lever is brought into contact with the projecting portion of the cam plate which is reversely rotated.

When the direction of rotation of the pulse motor 53 is changed immediately after the itch lever 105 has been swung by the projection 116 and before the cam plate 55 is forwardly rotated up to the rotation position shown in FIG. 18, i.e., before the swinging piece 69 of the stopper 66 passes the hole 86, the cam plate 55 is not stopped at the rotation position shown in FIG. 17 and reversely rotated. Then, as shown in FIG. 19, the projecting portion 116 contacts the switch lever 105. The switch lever 105 can not in the counterclockwise direction in FIG. 19. However, as shown in FIGS. 10 and 11, the switch lever 105 is guided by the guide surface 123 of the projecting portion 116 and retracted in the axial direction of the cam plate 55, relatively to the projecting portion 116. In fact, the cam plate 55 is moved, and retracted. That is, the switch lever 105 is not swung, in the reverse direction, by any of the projecting portions 111 through 116 even if the cam plate 55 is erroneously or wrongly operated, thereby preventing a breakage of the switch 104. In the present embodiment, a saving mechanism is configured as described above. This saving mechanism is easily provided since the cam plate 55 is configured to be retractable in the axial direction thereof.

It is to be understood that the present invention may be embodied with other changes and modifications that may occur to a person skilled in the art, without departing from the spirit and scope of the invention defined in the appended claims.

Figure 20:
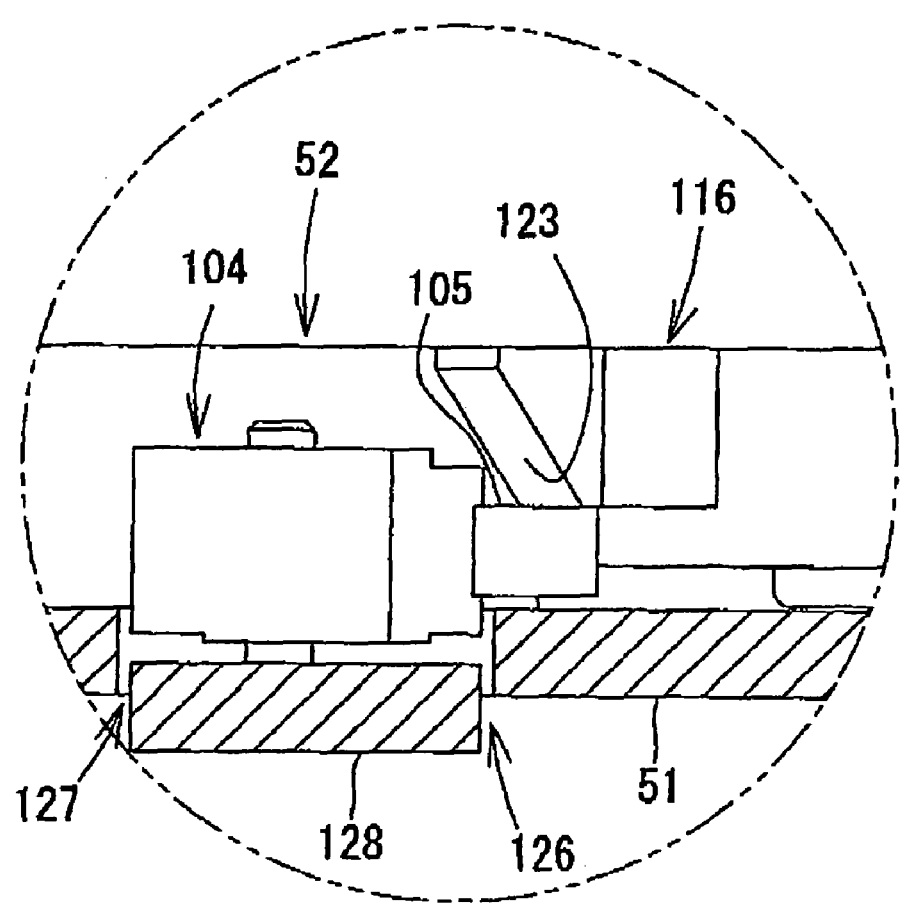
FIG. 20 is an enlarged partial view showing a state in which a switch is moved in an axial direction of the cam plate in a modified example of the embodiment.

For example, in the present embodiment, the cam plate 55 is retracted, in its axial direction, owing to the arrangement in which the switch lever 105 contacts the guide surface 123 of each of the projecting portions 111 through 116. Instead, the switch 104 may be configured to be retracted in the axial direction of the cam plate 55. For example, the switch 104 may be attached to the frame 51 so as to be displaceable by a predetermined distance in the axial direction of the cam plate 55. Further, as shown in FIG. 20, notches 126, 127 may be formed in a part 128 of the frame 51 which supports the switch 104, whereby the part 128 is easily deformed or bent such that the switch 104 is displaceable in the axial direction of the cam plate 55.

Figure 21:
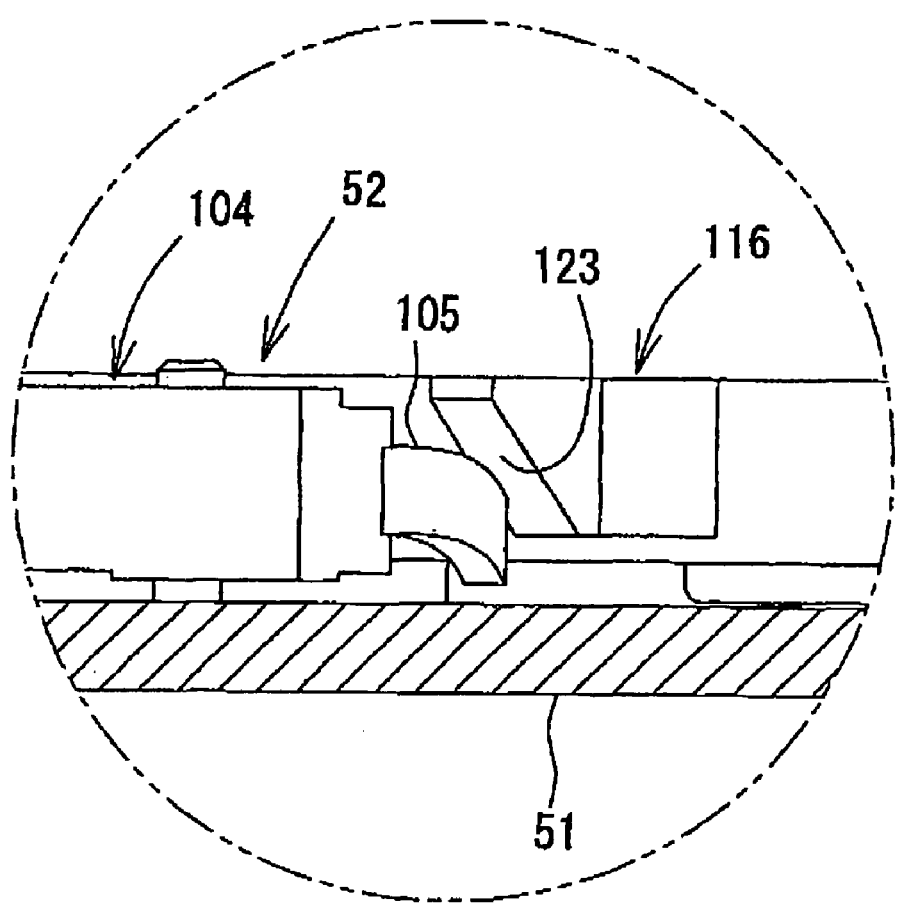
FIG. 21 is an enlarged partial view showing a state in which a switch lever is moved in the axial direction of the cam plate in another modified example of the embodiment.
Figure 22:
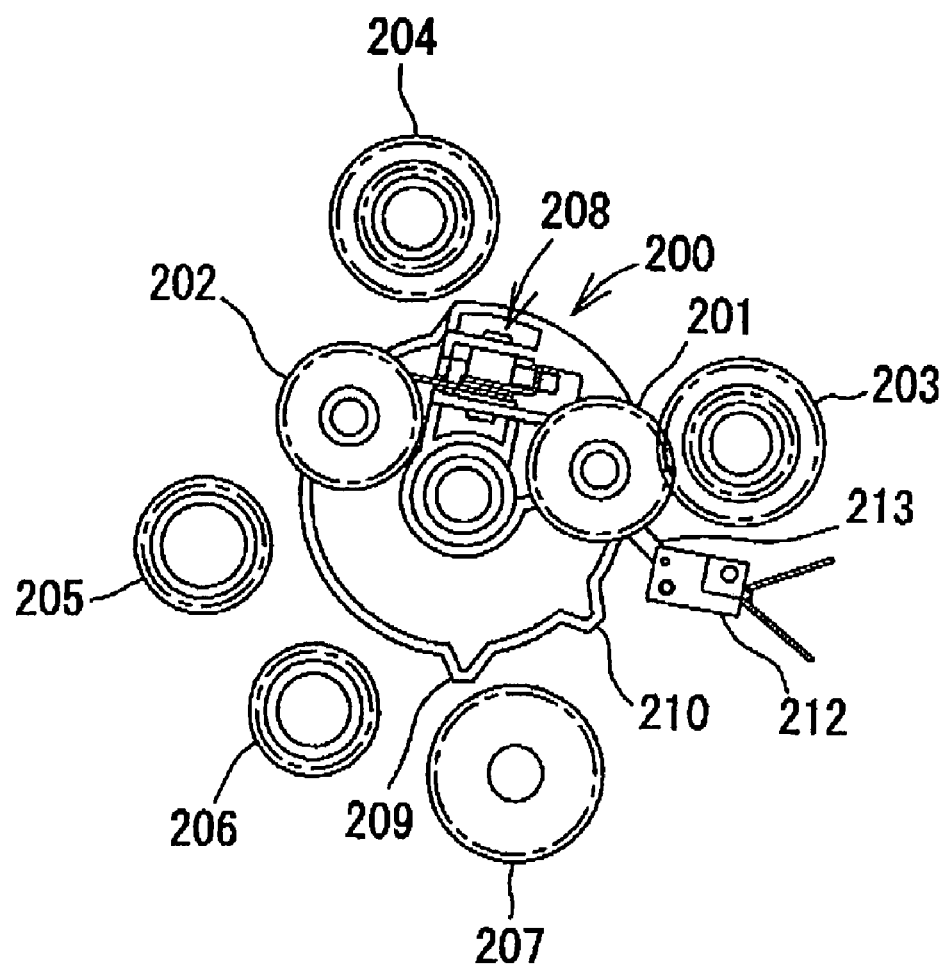
FIG. 22 is a plan view for explaining a manner of changing driving-force transmitting modes in a conventional transmission.
Figure 23:
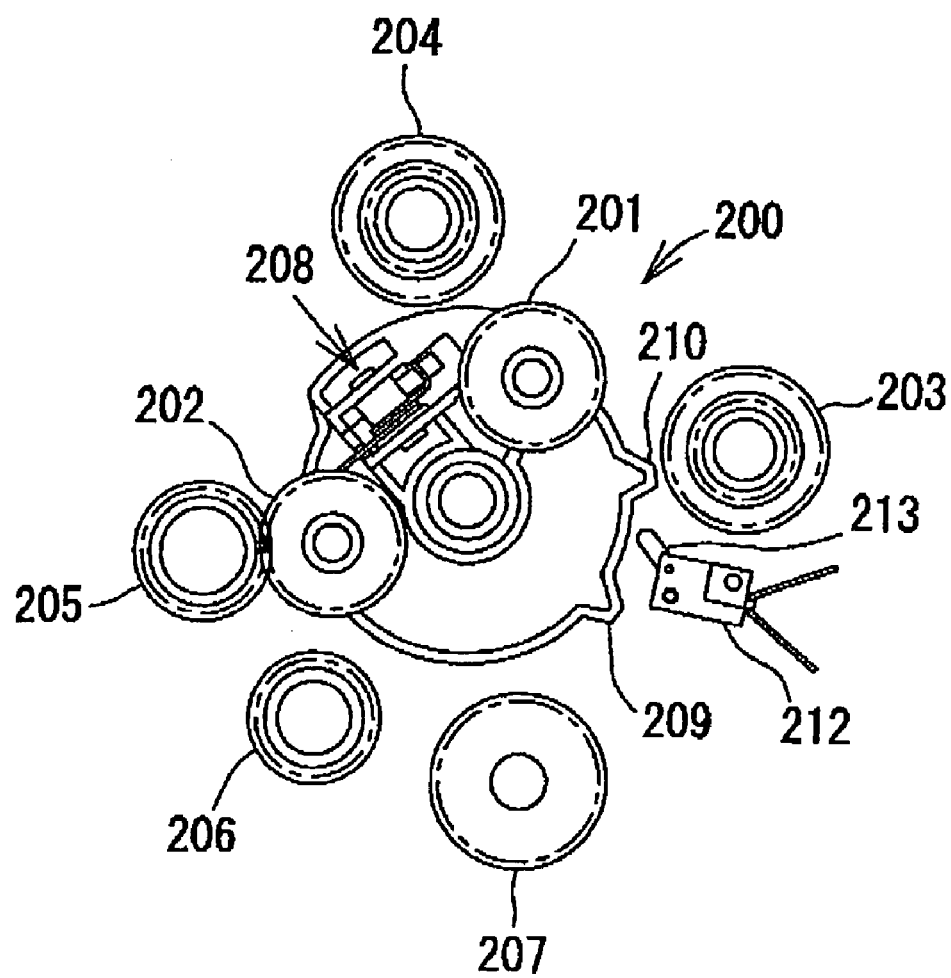
FIG. 23 is another plan view for explaining the manner of changing the driving-force transmitting modes in the conventional transmission.
Figure 24:
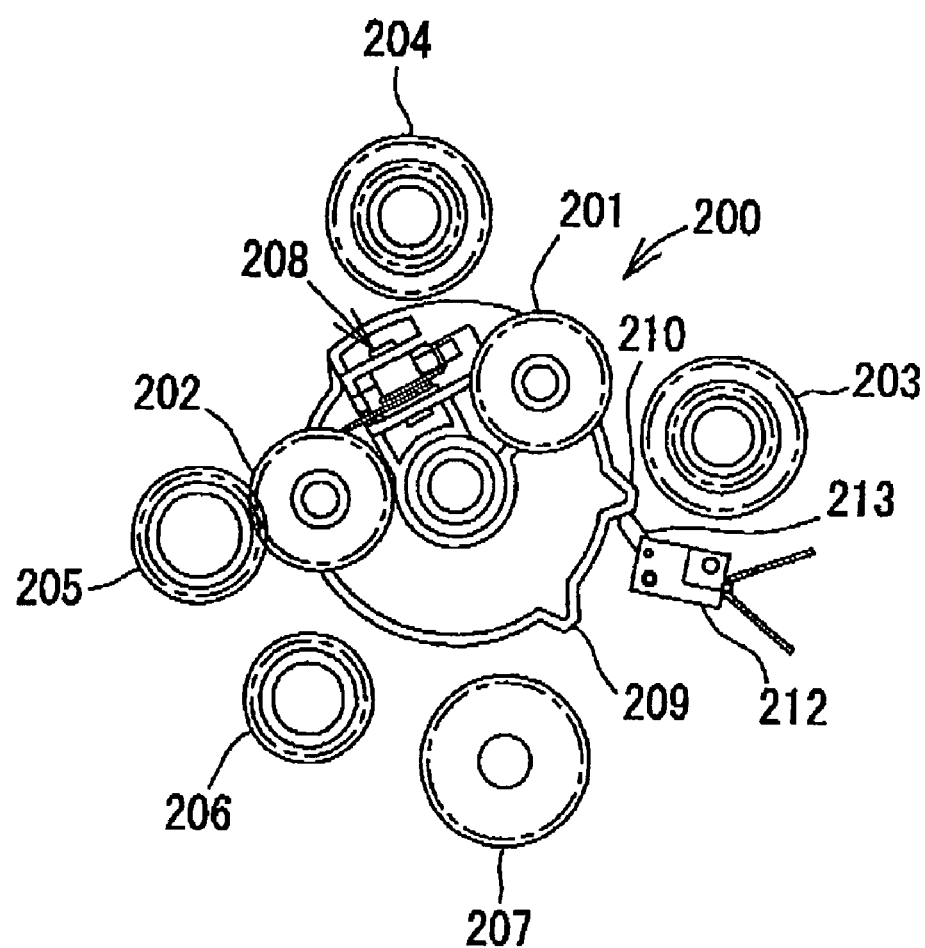
FIG. 24 is another plan view for explaining the manner of changing the driving-force transmitting modes in the conventional transmission.

Further, as shown in FIG. 21, the switch lever 105 may be made of a material which is moderately elastically deformable, whereby the switch lever 105 may be deformed or bent per se when being engaged with the guide surface 123 of each of the projecting portions 111 through 116. It is to be understood that the above-described arrangements may be appropriately combined to provide the saving mechanism to be employed in the present invention.

What is claimed is:

1. A transmission, comprising:
    a sun gear forwardly and reversely rotatable by a driving force transmitted from a driving source;
    a rotary member provided to be forwardly and reversely rotatable about a same rotation axis as a rotation axis of the sun gear, and having a projecting portion projecting radially outwardly at a predetermined position thereof;
    a clutch configured to cause the rotary member to be forwardly rotated by a forward rotation of the sun gear and reversely rotated by a reverse rotation of the sun gear, and not to cause the rotary member to be reversely rotated when a load having a predetermined torque is applied to the rotary member,
    a planetary gear which is rotatably supported by the rotary member, meshed with the sun gear, revolved around the sun gear by a rotation of the rotary member, and rotated by a rotation of the sun gear in a case in which the rotation of the rotary member is inhibited;
    a transmission gear which is meshed with the planetary gear and rotated by a rotation thereof, when the planetary gear is positioned at a predetermined revolution position thereof;
    a stopper configured to inhibit the rotary member from being reversely rotated at a first rotation position thereof in which the planetary gear is positioned at the predetermined revolution position;
    a switch including a switch lever which the projecting portion contacts when the rotary member is rotated, and being configured to detect, by utilizing a swinging of the switch lever, a second rotation position of the rotary member based on which the rotation of the rotary member is changed from a forward rotation thereof to a reverse rotation thereof, the switch being configured to permit the swinging of the switch lever caused by the projecting portion when the rotary member is forwardly rotated and to restrict the swinging of the switch lever caused by the projecting portion when the rotary member is reversely rotated; and
    a saving mechanism which saves the switch lever from being forcedly swung by the projecting portion when the rotary member is reversely rotated.

2. The transmission according to claim 1, wherein the saving mechanism is configured to retract at least one of the projecting portion of the rotary member and the switch lever in an axial direction in which the rotation axis of the rotary member extends.

3. The transmission according to claim 2, wherein the saving mechanism includes a guide surface which is provided on one of the projecting portion of the rotary member and the switch lever and which is configured to move the at least one of the projecting portion of the rotary member and the switch lever in the axial direction.

4. The transmission according to claim 3, wherein the switch lever is elastically deformable in the axial direction.

5. The transmission according to claim 3, wherein the saving mechanism is configured to permit at least one of the rotary member and the switch to move in the axial direction.

6. The transmission according to claim 1, comprising: (a) a plurality of said transmission gears; and (b) a plurality of said stoppers each of which inhibits the rotary member from being reversely rotated at a rotation position in which the planetary gear is meshed with a corresponding one of the plurality of transmission gears, wherein a rotational force of the sun gear is selectively transmittable to said one of the plurality of transmission gears with which the planetary gear is meshed.

7. A communication apparatus comprising the transmission according to claim 6, wherein the communication apparatus further comprises a plurality of driving portions respectively corresponding to the plurality of transmission gears, and is configured to transmit the driving force of the driving source to a selected one of the plurality of driving portions.

8. The communication apparatus according to claim 7, wherein the plurality of driving portions include at least a document-carrying portion arranged for carrying a document to read an image therefrom and a sheet-carrying portion arranged for carrying a recording sheet to form the image thereon, and wherein the communication apparatus functions as a facsimile apparatus by which image data are communicable.

\* \* \* \* \*